United States Patent
Shouno

(10) Patent No.: US 7,474,862 B2
(45) Date of Patent: Jan. 6, 2009

(54) JOB DISPLAY CONTROL METHOD

(75) Inventor: Hiroki Shouno, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 11/126,767

(22) Filed: May 11, 2005

(65) Prior Publication Data

US 2005/0254086 A1    Nov. 17, 2005

(30) Foreign Application Priority Data

May 14, 2004    (JP)    ............................. 2004-145033

(51) Int. Cl.
    *G03G 15/00*    (2006.01)
(52) U.S. Cl. .......................................... 399/80; 399/81
(58) Field of Classification Search .............. 399/79–81
    See application file for complete search history.

(56) References Cited

U.S. PATENT DOCUMENTS 7,050,735 B2 *    5/2006    Bardolatzy et al. ............ 399/79

7,120,910 B2 *    10/2006    Matsuda et al. ............. 718/102

FOREIGN PATENT DOCUMENTS

| JP | 2002-007079 A | 1/2002 |
| JP | 2003-189036 A | 1/2003 |

* cited by examiner

Primary Examiner—David M. Gray
Assistant Examiner—Joseph S. Wong
(74) Attorney, Agent, or Firm—Canon U.S.A., Inc., IP Division

(57) ABSTRACT

An image forming apparatus and job display control method for authenticating a job processing requester when a job process is requested. Upon authentication of the job processing requester, attributes of the job processing requester are determined, and based on this determination, the job processing records of the job processing requester are either displayed or masked when other users view the job processing requester's job processing records.

11 Claims, 16 Drawing Sheets

FIG. 6

Cxxxx PROPERTY

| GENERAL | COMMON | PORT | DETAILED SETTINGS | RECORD SETTINGS | DEVICE SETTINGS | USER SETTINGS |

RECORD ITEMS TO BE DISCLOSED TO OTHER USERS

- ☐ DOCUMENT NAME —601
- ☑ USER NAME —602
- ☑ TIME AND DATE —603
- ☐ NUMBER OF PRINT COPIES —604
- ☑ COLOR —605
- ☑ PRINT RESULT —606

[OK] [CANCEL] [APPLY (A)] [HELP]

FIG. 11

| DOCUMENT NAME | USER NAME | TIME AND DATE | NUMBER OF PRINT COPIES | COLOR | RESULT | |
|---|---|---|---|---|---|---|
| Data. txt | Test | **** | **** | **** | OK | ~1101 |
| Test. txt | Cxxxx | 2003/11/28/22:00 | 4 | Yes | OK | ~1102 |
| **** | Yamada | **** | 10 | No | NG | ~1103 |
| ... | ... | ... | ... | ... | ... | |
| . | . | . | . | . | . | |

FIG. 12

| DOCUMENT NAME | USER NAME | DAY AND TIME | NUMBER OF PRINT COPIES | COLOR | RESULT | |
|---|---|---|---|---|---|---|
| Data. txt | Test | 2003/11/10/12:00 | 1 | No | OK | ~1201 |
| Test. txt | Cxxxx | 2003/11/28/22:00 | 4 | Yes | OK | ~1202 |
| Doc. txt | Yamada | 2003/11/29/1:11 | 10 | No | NG | ~1203 |
| ... | ... | ... | ... | ... | ... | |
| . | . | . | . | . | . | |

FIG. 13

| DOCUMENT NAME | USER NAME | DAY AND TIME | NUMBER OF PRINT COPIES | COLOR | RESULT | |
|---|---|---|---|---|---|---|
| Data. txt | Test | **** | **** | **** | OK | ~1301 |
| **** | Cxxxx | 2003/11/28/22:00 | **** | Yes | OK | ~1302 |
| Doc. txt | Yamada | 2003/11/29/1:11 | 10 | No | NG | ~1303 |
| ... | ... | ... | ... | ... | ... | |
| . | . | . | . | . | . | |

FIG. 20

STORAGE MEDIUM SUCH AS FD OR CD-ROM

| DIRECTORY INFORMATION |
|---|
| FIRST DATA PROCESSING PROGRAM PROGRAM CODE SET CORRESPONDING TO STEPS OF FLOWCHART OF FIG. 4 |
| SECOND DATA PROCESSING PROGRAM PROGRAM CODE SET CORRESPONDING TO STEPS OF FLOWCHART OF FIG. 8 |
| THIRD DATA PROCESSING PROGRAM PROGRAM CODE SET CORRESPONDING TO STEPS OF FLOWCHART OF FIG. 9 |
| FOURTH DATA PROCESSING PROGRAM PROGRAM CODE SET CORRESPONDING TO STEPS OF FLOWCHART OF FIG. 14 |
| FIFTH DATA PROCESSING PROGRAM PROGRAM CODE SET CORRESPONDING TO STEPS OF FLOWCHART OF FIG. 16 |
| SIXTH DATA PROCESSING PROGRAM PROGRAM CODE SET CORRESPONDING TO STEPS OF FLOWCHART OF FIG. 17 |
| |

MEMORY MAP OF STORAGE MEDIUM

JOB DISPLAY CONTROL METHOD

BACKGROUND OF THE INVENTION

1. Field of the Invention

The present invention relates to an image forming apparatus including a job processor that processes predetermined different jobs, an information processing apparatus, a job display control method, a computer-readable program, and a storage medium storing such a program.

2. Description of the Related Art

Hitherto, in an environment in which a printer and a plurality of computers are connected to a local area network (LAN) and communicate with each other, the printer receives print jobs from the plurality of computers and performs a printing operation. In this case, a plurality of users install printer drivers on the corresponding computers and send print jobs to the printer, and the printer processes each of the received jobs and performs a printing operation.

A considerable number of printers have a record storage function. For example, when receiving a print job, a printer stores information concerning the processing date, job name, number of print copies, etc. in a storage device of the printer, and the administrator and general users of the printer can check the information.

This makes it possible for the user who has sent the print job to check the output of the print job and also for the administrator to manage the printer. Some printers are provided with a display editing function of displaying only specific items of record information.

Additionally, the image forming system, the job display control method, and the job release control method that implement an easy-to-use system disclosed in Japanese Patent Laid-Open No. 2002-7079 provide the following technique. The order of jobs managed by a server in the image forming system are rearranged, or only jobs selected under certain selection conditions (keywords) are displayed, or all the jobs are simultaneously selected to perform the same processing.

According to the above-configured known printers, however, the settings are unconditionally disclosed to all users. Thus, information that is sensitive to other users may be displayed, or even if a user wishes to check certain items of record information, such items are not displayed. The sensitive information is not disclosed even to the administrator, thereby causing problems in controlling the printer by the administrator.

SUMMARY OF THE INVENTION

The present invention provides an image forming apparatus, a job display control method, a computer-readable program, and a storage medium storing such a program in which, when rules for displaying job processing record items to be displayed on an operation display unit are set by each job processing requester, authentication is conducted for the job processing requester when making a job processing request, and then, the attribute of the job processing requester is determined, and the job processing records of the job processing requesters are displayed on the operation display unit by differentiating a display mode based on a result of determining the attribute and the rules. With this configuration, after authenticating a user for using the image forming apparatus, job record information items that the user does not wish to be displayed to other users can be masked. Accordingly, the user can customize job record information items to be displayed as desired.

The present invention also provides an image forming apparatus, a job display control method, a computer-readable program, and a storage medium storing such a program in which, when rules for displaying job processing record items set by a predetermined setting screen displayed by using a browser of an information processing apparatus and to be displayed on an operation display unit are set by each job processing requester, authentication is conducted for the job processing requester when making a job processing request, and then, the attribute of the job processing requester is determined, and the job processing records of the job processing requesters are displayed on the operation display unit by differentiating a display mode based on a result of determining the attribute and the rules. With this configuration, after authenticating a user for using the image forming apparatus from the information processing apparatus, such as a host computer, via a network, job record information items that the user does not wish to be displayed to other users can be masked. Accordingly, the user can customize job record information items to be displayed as desired.

The present invention also provides an image forming apparatus, a job display control method, a computer-readable program, and a storage medium storing such a program in which, when rules for displaying job processing record items set by a predetermined setting screen displayed by using a browser of an information processing apparatus and to be displayed on an operation display unit are set by each job processing requester, authentication is conducted for the job processing requester when making a job processing request, and then, the attribute of the job processing requester is determined, and the job processing records of the job processing requesters are displayed on the screen of the information processing apparatus by using the browser by differentiating a display mode based on a result of determining the attribute and the rules. With this configuration, after authenticating a user for using the image forming apparatus from the information processing apparatus, such as a host computer, via a network, job record information items that the user does not wish to be displayed to other users can be masked on the screen of the information processing apparatus by using the browser. Accordingly, the user can customize job record information items to be displayed as desired.

The present invention also provides an information processing apparatus, a job display control method, a computer-readable program, and a storage medium storing such a program in which, when making a job processing request, authentication information for specifying a job processing requester is input by using a predetermined setting screen, and after conducting authentication based on the input authentication information, rules for displaying job processing record items on an operation display unit of an image forming apparatus are set by the job processing requester, and then, a browser of the information processing apparatus obtains job processing record information determined by the image forming apparatus according to the rules, and displays the job processing records of the job processing requesters on the predetermined setting screen by differentiating a display mode. With this configuration, after authenticating a user for using the image forming apparatus from the information processing apparatus, such as a host computer, via a network, job record information items that the user does not wish to be displayed to other users can be masked on the screen of the information processing apparatus by using the browser. Accordingly, the user can customize job record information items to be displayed as desired.

According to a first aspect of the present invention, there is provided an image forming apparatus including job processing means for processing predetermined different jobs. The image forming apparatus includes the following elements: record storage means that stores job processing records concerning the jobs processed by the job processing means according to each job processing requester; setting means that sets rules for displaying job processing record items to be displayed on an operation display unit by each job processing requester; authentication means that conducts authentication for each job processing requester when the job processing requester requests the job processing means to process a job; determining means that determines an attribute of the job processing requester authenticated by the authentication means; and control means that displays the job processing records stored in the record storage means on the operation display unit by differentiating a display mode based on a result obtained by the determining means and the rules set by the setting means.

According to a second aspect of the present invention, there is provided an image forming apparatus including job processing means for processing predetermined different jobs and a web server for executing a web server function to display a predetermined setting screen by using a browser of an information processing apparatus that can be communicated on a network. The image forming apparatus includes the following elements: record storage means that stores job processing records concerning the jobs processed by the job processing means according to each job processing requester; setting means that sets rules for displaying job processing record items set by the predetermined setting screen displayed by using the browser of the information processing apparatus and to be displayed on an operation display unit by each job processing requester; authentication means that conducts authentication for each job processing requester when the job processing requester requests the job processing means to process a job; determining means that determines an attribute of the job processing requester authenticated by the authentication means; and control means that displays the job processing records stored in the record storage means on the operation display unit by differentiating a display mode based on a result obtained by the determining means and the rules set by the setting means.

According to a third aspect of the present invention, there is provided an image forming apparatus including job processing means for processing predetermined different jobs and a web server for executing a web server function to display a predetermined setting screen by using a browser of an information processing apparatus that can be communicated on a network. The image forming apparatus includes the following elements: record storage means that stores job processing records concerning the jobs processed by the job processing means according to each job processing requester; setting means that sets rules for displaying job processing record items set by the predetermined setting screen displayed by using the browser of the information processing apparatus and to be displayed on an operation display unit by each job processing requester; authentication means that conducts authentication for each job processing requester on the predetermined setting screen displayed by using the browser of the information processing apparatus when the job processing requester requests the job processing means to process a job; and determining means that determines an attribute of the job processing requester authenticated by the authentication means. The web server can display the job processing records stored in the record storage means on the predetermined setting screen displayed by using the browser of the information processing apparatus by differentiating a display mode based on a result obtained by the determining means and the rules set by the setting means.

According to a fourth aspect of the present invention, there is provided an information processing apparatus for obtaining information concerning a predetermined setting screen from a server function provided for an image forming apparatus and for displaying the information concerning the predetermined setting screen on display means via a browser. The information processing apparatus includes the following elements: input means inputs authentication information for specifying a job processing requester by using the predetermined setting screen when the job processing requester makes a job processing request; and setting means that sets, after conducting authentication based on the input authentication information, rules for displaying job processing record items on an operation display unit of the image forming apparatus by using the predetermined setting screen by the job processing requester. The browser obtains job processing record information determined by the image forming apparatus according to the rules set by the setting means, and displays the job processing records of each job processing requester on the predetermined setting screen by differentiating a display mode.

According to a fifth aspect of the present invention, there is provided a job display control method for an image forming apparatus including job processing means for processing predetermined different jobs and record storage means for storing job processing records concerning the jobs processed by the job processing means according to each job processing requester. The job display control method includes: a setting step of setting rules for displaying job processing record items to be displayed on an operation display unit by each job processing requester; an authentication step of conducting authentication for each job processing requester when the job processing requester requests the job processing means to process a job; and a determining step of determining an attribute of the job processing requester authenticated in the authentication step; and a control step of displaying the job processing records stored in the record storage means on the operation display unit by differentiating a display mode based on a result obtained in the determining step and the rules set in the setting step.

According to a sixth aspect of the present invention, there is provided a job display control method for an image forming apparatus including job processing means for processing predetermined different jobs, record storage means for storing job processing records concerning the jobs processed by the job processing means according to each job processing requester, and a web server for executing a web server function to display a predetermined setting screen by using a browser of an information processing apparatus that can be communicated on a network. The job display control method includes: a setting step of setting rules for displaying job processing record items set by the predetermined setting screen displayed by using the browser of the information processing apparatus and to be displayed on an operation display unit by each job processing requester; an authentication step of conducting authentication for each job processing requester when the job processing requester requests the job processing means to process a job; and a determining step of determining an attribute of the job processing requester authenticated in the authentication step; and a control step of displaying the job processing records stored in the record storage means on the operation display unit by differentiating a display mode based on a result obtained in the determining step and the rules set in the setting step.

According to a seventh aspect of the present invention, there is provided a job display control method for an image forming apparatus including job processing means for processing predetermined different jobs, a web server for executing a web server function to display a predetermined setting screen by using a browser of an information processing apparatus that can be communicated on a network, and record storage means for storing job processing records concerning the jobs processed by the job processing means according to each job processing requester. The job display control method includes: a setting step of setting rules for displaying job processing record items set by the predetermined setting screen displayed by using the browser of the information processing apparatus and to be displayed on an operation display unit by each job processing requester; an authentication step of conducting authentication for each job processing requester on the predetermined setting screen displayed by using the browser of the information processing apparatus when the job processing requester requests the job processing means to process a job; and a determining step of determining an attribute of the job processing requester authenticated in the authentication step. The web server can display the job processing records stored in the record storage means on the predetermined setting screen displayed by using the browser of the information processing apparatus by differentiating a display mode based on a result obtained in the determining step and the rules set in the setting step.

According to an eighth aspect of the present invention, there is provided a job display control method for an information processing apparatus for obtaining information concerning a predetermined setting screen from a server function provided for an image forming apparatus and for displaying the information concerning the predetermined setting screen on display means via a browser. The job display control method includes: an input step of inputting authentication information for specifying a job processing requester by using the predetermined setting screen when the job processing requester makes a job processing request; and a setting step of setting, after conducting authentication based on the input authentication information, rules for displaying job processing record items on an operation display unit of the image forming apparatus by using the predetermined setting screen by the job processing requester. The browser obtains job processing record information determined by the image forming apparatus according to the rules set in the setting step, and displays the job processing records of each job processing requester on the predetermined setting screen by differentiating a display mode.

According to a ninth aspect of the present invention, there is provided a job display control program for an image forming apparatus including job processing means for processing predetermined different jobs and record storage means for storing job processing records concerning the jobs processed by the job processing means according to each job processing requester. The job display control program includes: a setting step of setting rules for displaying job processing record items to be displayed on an operation display unit by each job processing requester; an authentication step of conducting authentication for each job processing requester when the job processing requester requests the job processing means to process a job; and a determining step of determining an attribute of the job processing requester authenticated in the authentication step; and a control step of displaying the job processing records stored in the record storage means on the operation display unit by differentiating a display mode based on a result obtained in the determining step and the rules set in the setting step.

According to a tenth aspect of the present invention, there is provided a job display control program for an image forming apparatus including job processing means for processing predetermined different jobs, record storage means for storing job processing records concerning the jobs processed by the job processing means according to each job processing requester, and a web server for executing a web server function to display a predetermined setting screen by using a browser of an information processing apparatus that can be communicated on a network. The job display control program includes: a setting step of setting rules for displaying job processing record items set by the predetermined setting screen displayed by using the browser of the information processing apparatus and to be displayed on an operation display unit by each job processing requester; an authentication step of conducting authentication for each job processing requester when the job processing requester requests the job processing means to process a job; and a determining step of determining an attribute of the job processing requester authenticated in the authentication step; and a control step of displaying the job processing records stored in the record storage means on the operation display unit by differentiating a display mode based on a result obtained in the determining step and the rules set in the setting step.

According to an eleventh aspect of the present invention, there is provided a job display control program for an image forming apparatus including job processing means for processing predetermined different jobs, a web server for executing a web server function to display a predetermined setting screen by using a browser of an information processing apparatus that can be communicated on a network, and record storage means for storing job processing records concerning the jobs processed by the job processing means according to each job processing requester. The job display control program includes: a setting step of setting rules for displaying job processing record items set by the predetermined setting screen displayed by using the browser of the information processing apparatus and to be displayed on an operation display unit by each job processing requester; an authentication step of conducting authentication for each job processing requester on the predetermined setting screen displayed by using the browser of the information processing apparatus when the job processing requester requests the job processing means to process a job; and a determining step of determining an attribute of the job processing requester authenticated in the authentication step. The web server can display the job processing records stored in the record storage means on the predetermined setting screen displayed by using the browser of the information processing apparatus by differentiating a display mode based on a result obtained in the determining step and the rules set in the setting step.

According to a twelfth aspect of the present invention, there is provided a job display control program for an information processing apparatus for obtaining information concerning a predetermined setting screen from a server function provided for an image forming apparatus and for displaying the information concerning the predetermined setting screen on display means via a browser. The job display control method includes: an input step of inputting authentication information for specifying a job processing requester by using the predetermined setting screen when the job processing requester makes a job processing request; and a setting step of setting, after conducting authentication based on the input authentication information, rules for displaying job processing record items on an operation display unit of the image forming apparatus by using the predetermined setting screen by the job processing requester. The browser obtains job processing record information determined by the image forming apparatus according to the rules set in the setting step, and displays the job processing records of each job processing requester on the predetermined setting screen by differentiating a display mode.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 illustrates another example of the print setting screen displayed on a CRT display shown in FIG. 3.

FIG. 11 illustrates an example of a first record information display screen displayed on the panel shown in FIG. 2.

FIG. 12 illustrates an example of a second record information display screen displayed on the panel shown in FIG. 2.

FIG. 13 illustrates an example of a third record information display screen displayed on the panel shown in FIG. 2.

FIG. 20 illustrates a memory map of a storage medium storing various data processing programs readable by a print system including the information processing apparatus and the printer according to an embodiment of the present invention.

DESCRIPTION OF THE EMBODIMENTS

Embodiments of the present invention will now be described in detail in accordance with the accompanying drawings.

First Embodiment

Figure 1:
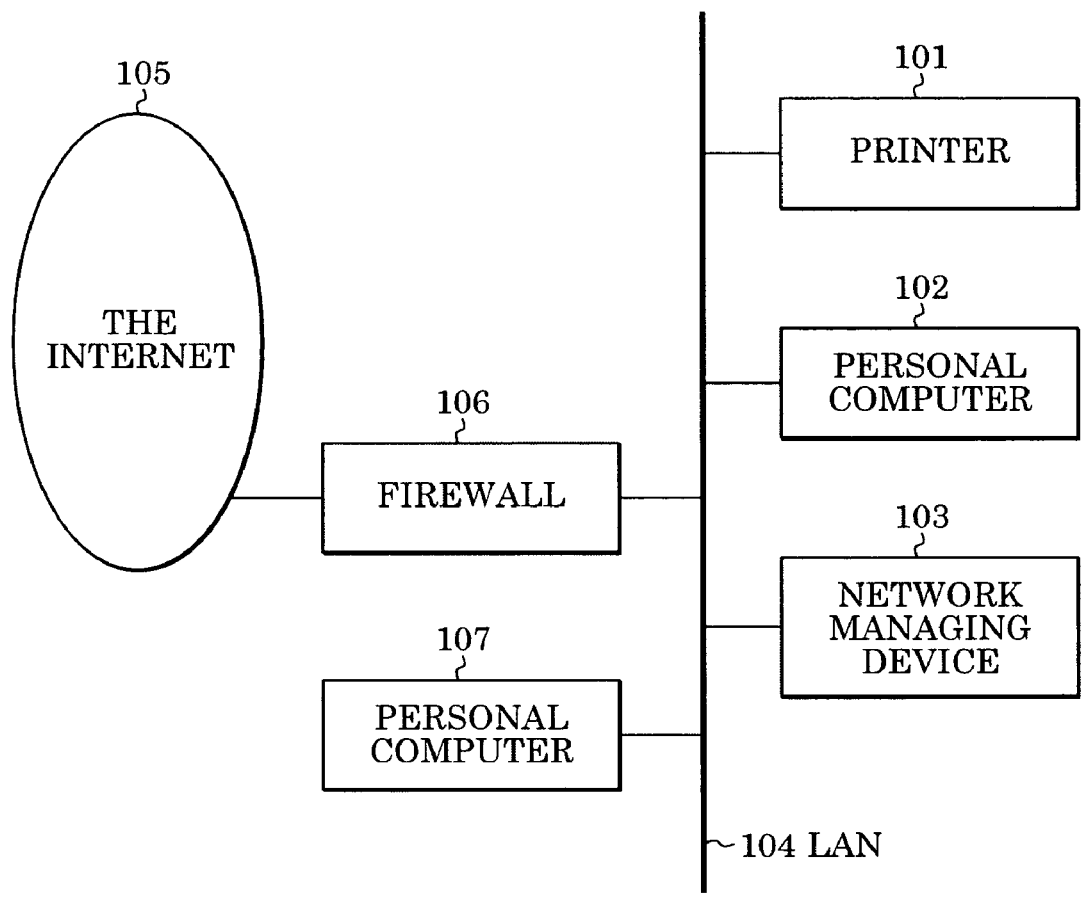
FIG. 1 is a block diagram illustrating an example of a print system including a printer and an information processing apparatus according to a first embodiment of the present invention.

FIG. 1 is a block diagram illustrating a print system to which a printer and an information processing apparatus according to a first embodiment of the present invention are applied.

In FIG. 1, a printer 101 is a multi-function peripheral (MFP) provided with a network interface, and can check or set information concerning the printer 101 by receiving print jobs via a network or using application software operating on a terminal by a user. A detailed configuration of the printer 101 is discussed later with reference to FIG. 2.

In this embodiment, a local area network (LAN) 104 is the Ethernet.

Personal computers 102 and 107 are general-purpose computers, which perform office operations, such as paper work and calculations by users, as well as various types of data processing (document processing, spreadsheet processing, graphic processing, etc.) by executing installed applications under a predetermined operating system (OS).

A printer driver, which serves as a control program for the printer 101, is installed on the storage unit of the personal computer 102, and can also execute the control operation for displaying various user interface (UI) screens for performing record settings or inputting operator information, as discussed below. A detailed configuration of the personal computer 102 is described later with reference to FIG. 3.

The printer 101, the personal computers 102 and 107, and a firewall 106, which is discussed later, are all connected to the LAN 104 by using a network interface card (NIC). The terminals and the printers connected to the LAN 104 are connected to each other via an Ethernet cable or a hub.

The LAN 104 is not restricted to the Ethernet, and may be any network to form a LAN, for example, the gigabit Ethernet (GbE) or a token ring network.

The Internet 105 is a generic term for a communication network that allows computers world-wide to connect with each other based on packet communication using network protocols, i.e., transport control protocol/internet protocol (TCP/IP).

The Internet 105 connects LANs with each other so that users throughout the world that are connected to the Internet 105 can communicate with each other by using the computers. Accordingly, the Internet 105 is referred to as "the network of networks", and the firewall 106 is used to ensure security of the LANs by protecting the LANs from unauthorized access. The firewall 106 can set a predetermined level of restrictions to prevent unauthorized packets from the exterior (e.g., the Internet 105) from entering the LAN 104.

General firewalls are routers or host computers installed between a local network, which is an internal source in a system, and the Internet, which is an external source of the system, for preventing unauthorized access from the exterior, or they are functional roles of the routers or host computers.

Functionally, firewalls catch all communication requests from the internal sources and the external source of the system and arbitrarily allow or prohibit such requests to pass through or from passing through the firewalls, thereby ensuring the security while providing only required services to the users.

The construction method for firewalls is not particularly restricted, and is considerably different according to the policy of the system. Generally, as the security is intensified, the Internet services that can be provided to users are more restricted.

Conversely, as the restriction of the Internet services is eased, the level of the security is decreased. There are three methods for allowing only required services to pass through firewalls, i.e., application gateway (Proxy), circuit level gateway, and packet filtering. In actual systems, high-security firewall systems are constructed by flexibly combining the three methods.

The firewall 106 of this embodiment has a file (filter setting file) in which data defining the types of IP packets to be prohibited from entering the LAN 104 is stored. When such IP packets are sent from the Internet 105, the firewall 106 prevents the IP packets from entering the LAN 104 based on the filter setting file by discarding the IP files.

When IP packets which are not prohibited from entering the LAN 104 are sent from the Internet 105, the firewall 106 transfers such IP packets to the LAN 104. A network managing device 103 is a personal computer used by the administrator who manages the LAN 104 and various devices connected to the LAN 104, and the operator of the network managing device 103 manages the printer 101 by using the network managing device 103. Although detailed configurations of the personal computers are not discussed in this embodiment, general software and hardware configurations are used. For example, a software package, such as spreadsheet software and word processor software, is installed.

Figure 2:
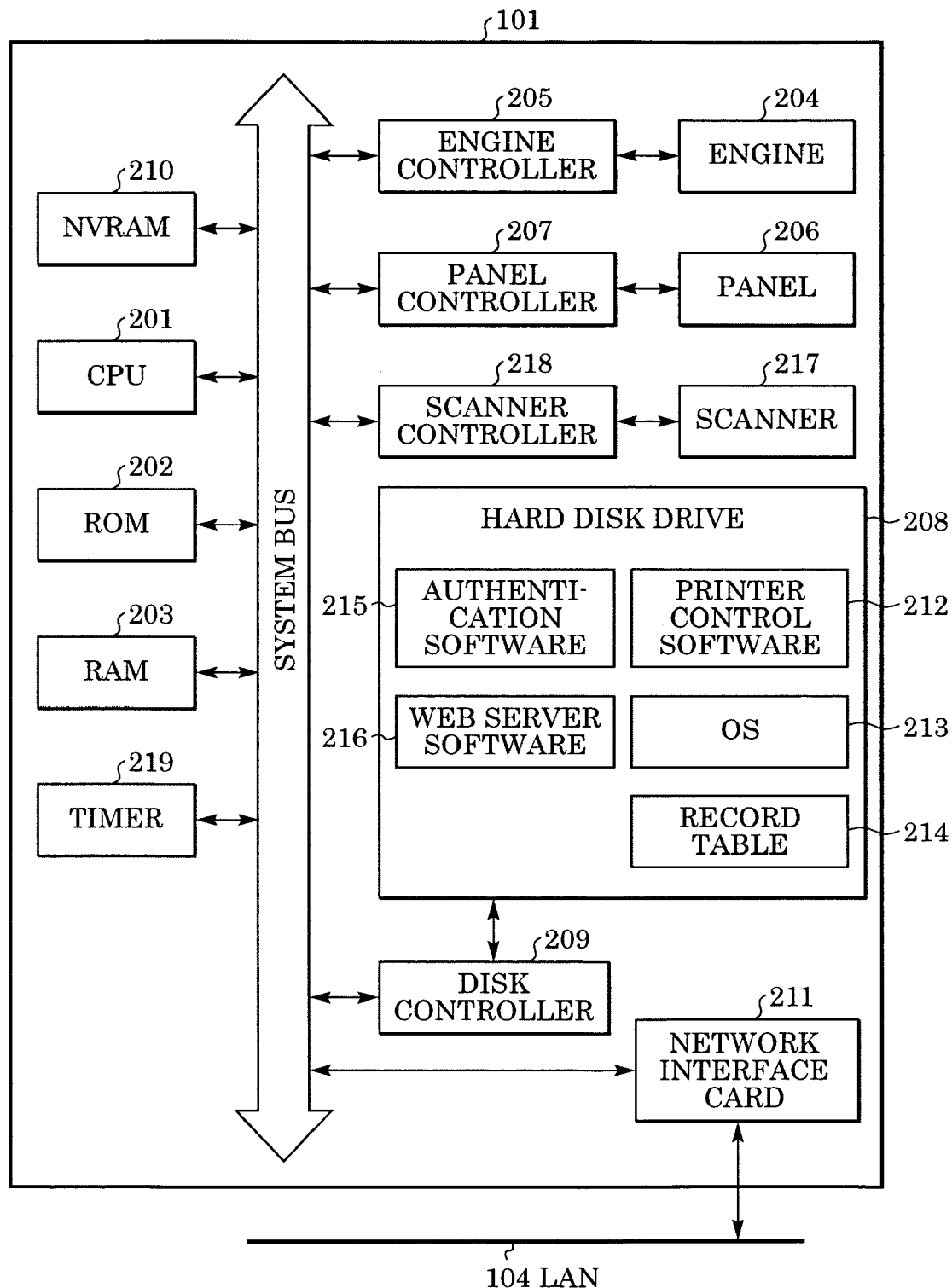
FIG. 2 is a block diagram illustrating a detailed configuration of the printer in the print system shown in FIG. 1.

The configuration of the printer 101, mainly details of controllers, in the print system shown in FIG. 1 is discussed below with reference to FIG. 2. In FIG. 2, elements similar to those of FIG. 1 are designated with like reference numerals.

The printer 101, as shown in FIG. 2, includes a central processing unit (CPU) 201 for controlling the overall operation of the printer 101, a read only memory (ROM) 202 for storing various programs and data used for the control operation by the CPU 201, a random access memory (RAM) 203 containing a main memory and a work area for the CPU 201, an engine 204 for printer functions (print functions and copy functions), an engine controller 205 for controlling the driving of the engine 204, a panel 206 for receiving various operation instructions from users and for displaying various items of information, a panel controller 207 for controlling input/output operations of the panel 206 and managing the panel 206, and a hard disk drive 208 for storing various programs and data.

Details of the data and programs stored in the hard disk drive 208 are discussed below.

The printer 101 also includes a disk controller 209 for controlling access from and to the hard disk drive 208, a non-volatile RAM (NVRAM) 210, and a network interface card 211 for sending and receiving data to and from other terminals and printers via the LAN 104.

In the hard disk drive 208, the programs executed by the CPU 201 and data used by the individual programs are stored. The main programs and data stored in the hard disk drive 208 in this embodiment are as follows.

Printer control software 212 is a software package for controlling the operation of the printer 101 as an MFP.

An OS 213 is the OS of the printer 101, and a software package, such as the printer control software 212, authentication software 215, and web server software 216, is operated on the OS 213 and is controlled by the printer control software 212.

The OS 213 used in this embodiment is VxWorks or Linux, which may be used in general MFPs or controllers.

A record table 214 is data on which operation records and job records of the printer 101 are stored such that the records of the individual users can be updated. A detailed configuration of the record table 214 is discussed below.

The authentication software 215 conducts authentication for users to be use the printer 101 according to a predetermined process, prohibits unauthenticated users from using the printer 101, and restricts the use of the functions of the printer 101 for some authenticated users.

The records of each user authenticated by the authentication software 215 are recorded in the record table 214. The web server software 216 stores information concerning hyper text markup language (HTML) files and images, and sends the information via a network, for example, the Internet, in response to a request from client software, such as a web browser.

In this embodiment, the authentication software 215 determines from an input password and ID whether the user is an authenticated user or whether the user is the administrator. However, another type of authentication processing, for example, fingerprint authentication, cornea authentication, or face feature authentication, may be performed in the present invention.

The authentication software 215 has a function of authenticating users accessed from a certain network node and of also displaying the record of the printer 101.

The printer 101 includes a scanner 217 having a function of scanning paper documents and converting information on the documents into digital data, e.g., a predetermined digital document format such as a portable document format (PDF). The digitized document is copied or sent to a device or a personal computer on a network by using network protocols.

Other software for operating the printer 101 is stored in the hard disk drive 208, though an explanation thereof is omitted in this embodiment. For example, data decompression software is contained in the printer control software 212.

The configuration of the personal computer 102, which serves as a sender of print jobs, is described below.

Figure 3:
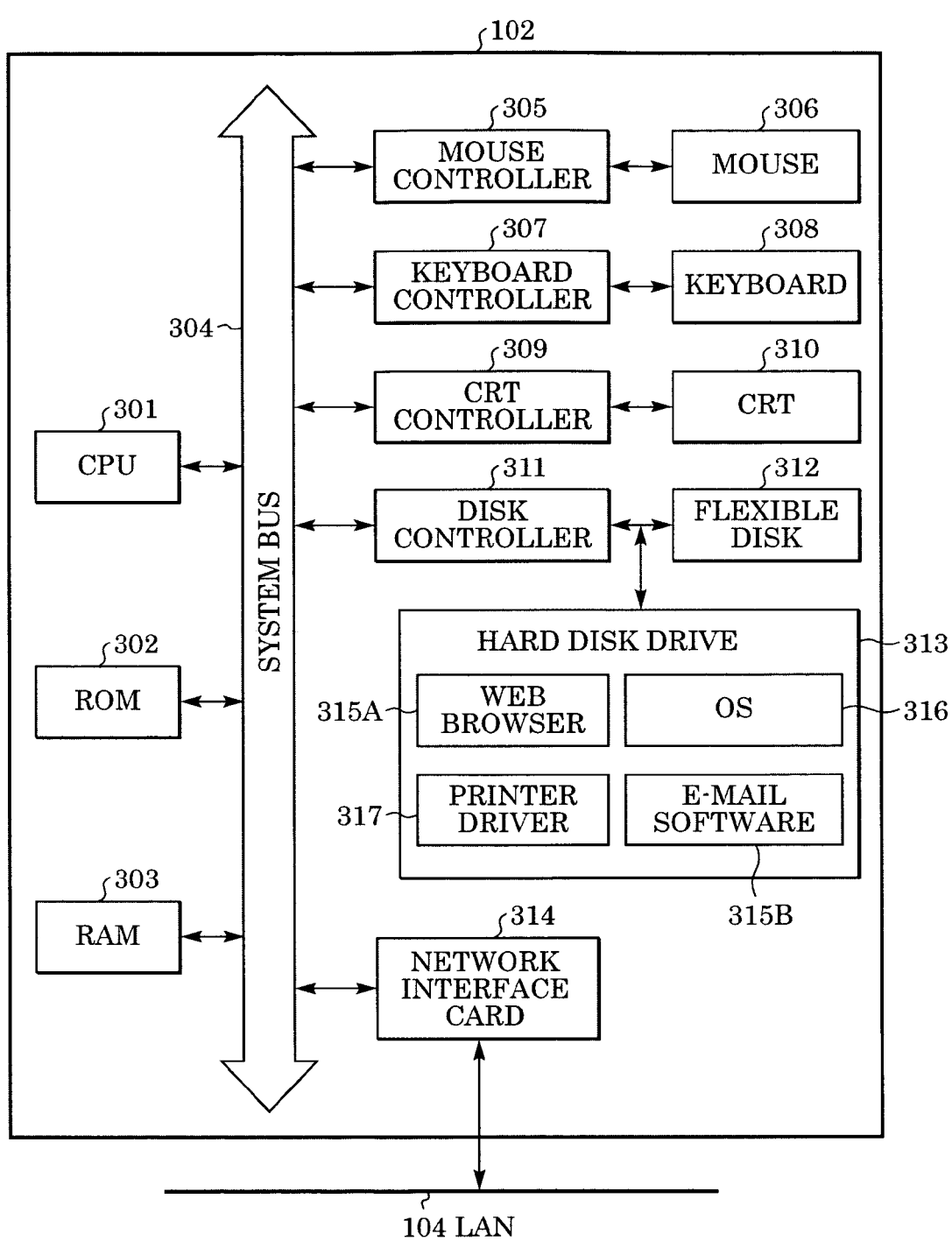
FIG. 3 is a block diagram illustrating a detailed configuration of the information processing apparatus in the print system shown in FIG. 1.

FIG. 3 is a block diagram illustrating the configuration of the personal computer 102 in the print system shown in FIG. 1. In FIG. 3, elements similar to those shown in FIG. 1 are indicated by like reference numerals. According to the configuration shown in FIG. 3, the personal computer 102 or 107 shown in FIG. 1 can send e-mail.

The personal computer 102 shown in FIG. 3 includes a CPU 301 for controlling the overall operation of the personal computer 102, a ROM 302 for storing various programs and data used for the control operation by the CPU 301, a RAM 303 containing a main memory and a work area for the CPU 301, a mouse 306, a mouse controller 305 for controlling instructions input from the mouse 306, a keyboard 308, a keyboard controller 307 for controlling instructions input from the keyboard 308 or a pointing device (not shown), a CRT display 310, a CRT controller 309 for controlling the display of the CRT display 310, a hard disk drive/floppy disk drive 313 for storing various programs and data (boot program, various applications, printer driver, port monitor, etc.), a disk controller 311 for controlling access with the hard disk drive/floppy disk drive 313, and a network interface card 314 for sending and receiving data to and from the printer 101, other personal computers, or the network managing device 103 (see FIG. 1) via the LAN 104. The above-described elements are connected to each other via a system bus 304 so that they can communicate with each other.

A web browser 315A and e-mail software 315B are stored in the hard disk drive/floppy disk drive 313 while being installed in an OS 316, which is discussed below. The web browser 315A is application software for browsing web pages.

The web browser 315A downloads, for example, HTML files, image files, and music files from the Internet 105, analyzes the layouts, and displays or plays back the files.

The web browser 315A allows a user to send data to a predetermined URL web server by using a form, and to operate application software expressed in various computer languages.

The OS 316 is installed on the hard disk drive/floppy disk drive 313. The OS 316 may be Windows® or Linux, which can be used for general purpose computers or workstations.

A printer driver 317 is printer driver software for sending print jobs to the printer 101. The printer driver 317 has the main function of converting various application data operating on the personal computer 102 into a data format (page description language (PDL)) readable by the printer 101. The printer driver 317 also has the function of performing two-way communication with the printer 101 to obtain and display various items of information concerning the printer 101 for the users and to allow the user to input authentication information to use the printer 101.

Features of the functions of the printer driver 317 and examples of graphical user interfaces (GUIs) are discussed below.

Figure 4:
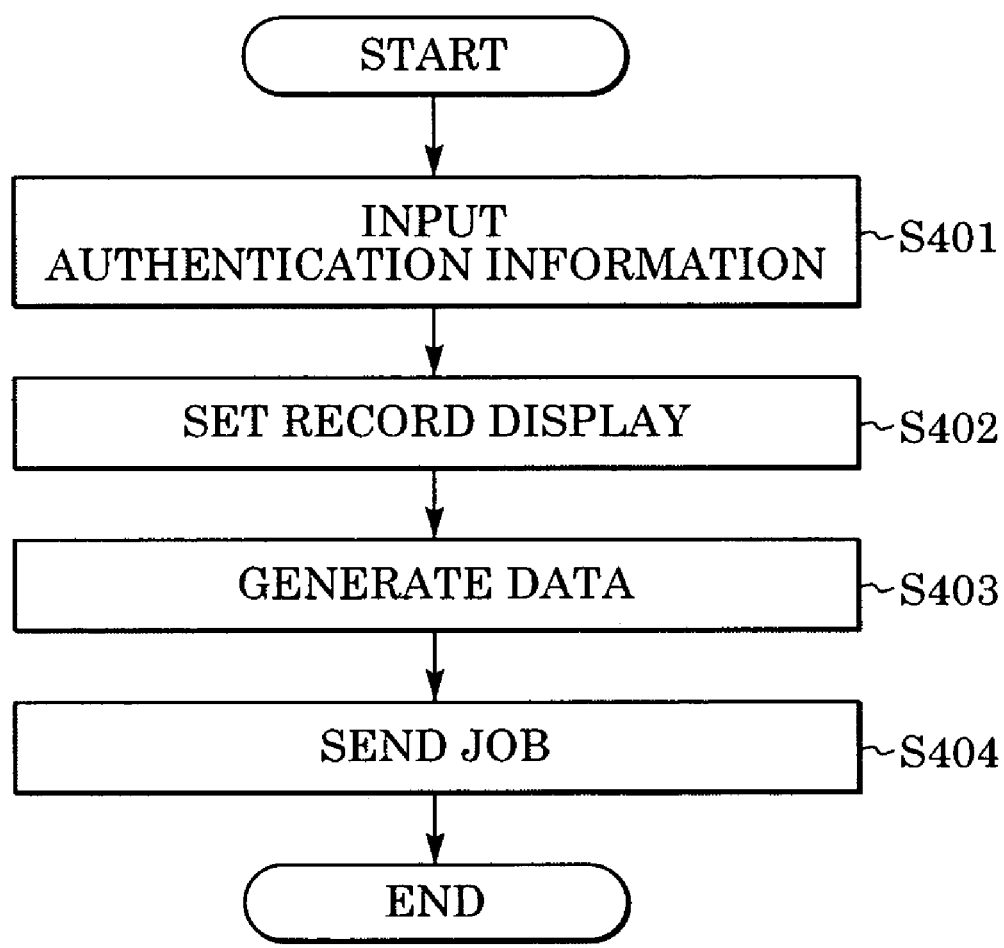
FIG. 4 is a flowchart illustrating an example of first data processing in the information processing apparatus according to the first embodiment of the present invention.

FIG. 4 is a flowchart illustrating an example of first data processing in the information processing apparatus according to the first embodiment of the present invention. In the data processing shown in FIG. 4, when the user of the personal computer 102 shown in FIG. 1 sends application data via the printer driver 317, the user inputs authentication data and determines whether a record is displayed for other users.

The processing shown in FIG. 4 is performed, presuming that the user of the personal computer 102 has operated the OS 316 shown in FIG. 3 to start a certain application program and edits desired data. In this state, the user starts printing the data that is being edited.

In step S401, the user operates an application program to give an instruction to start printing data. In response to this instruction, the OS 316 starts the printer driver 317 related to the printer 101.

The user opens a user authentication setting screen (see FIG. 5) for authenticating the user to use the printer 101 on the CRT display 310 from the GUI provided by the printer driver 317. The user to use the printer 101 inputs the user ID and password via the panel 206 or a network, and if the user is not authenticated, the user is not allowed to use the printer 101.

Accordingly, when giving an instruction to perform printing from the personal computer 102, the user is required to input the user ID and password by using the printer driver 317. The user ID and password input by using the printer driver 317 are sent to the printer 101, and authentication is conducted in the printer 101.

In a predetermined area of the hard disk drive 208 of the printer 101, the user IDs and passwords of the user of the personal computer 102, the network administrator, and other users are registered.

Figure 5:
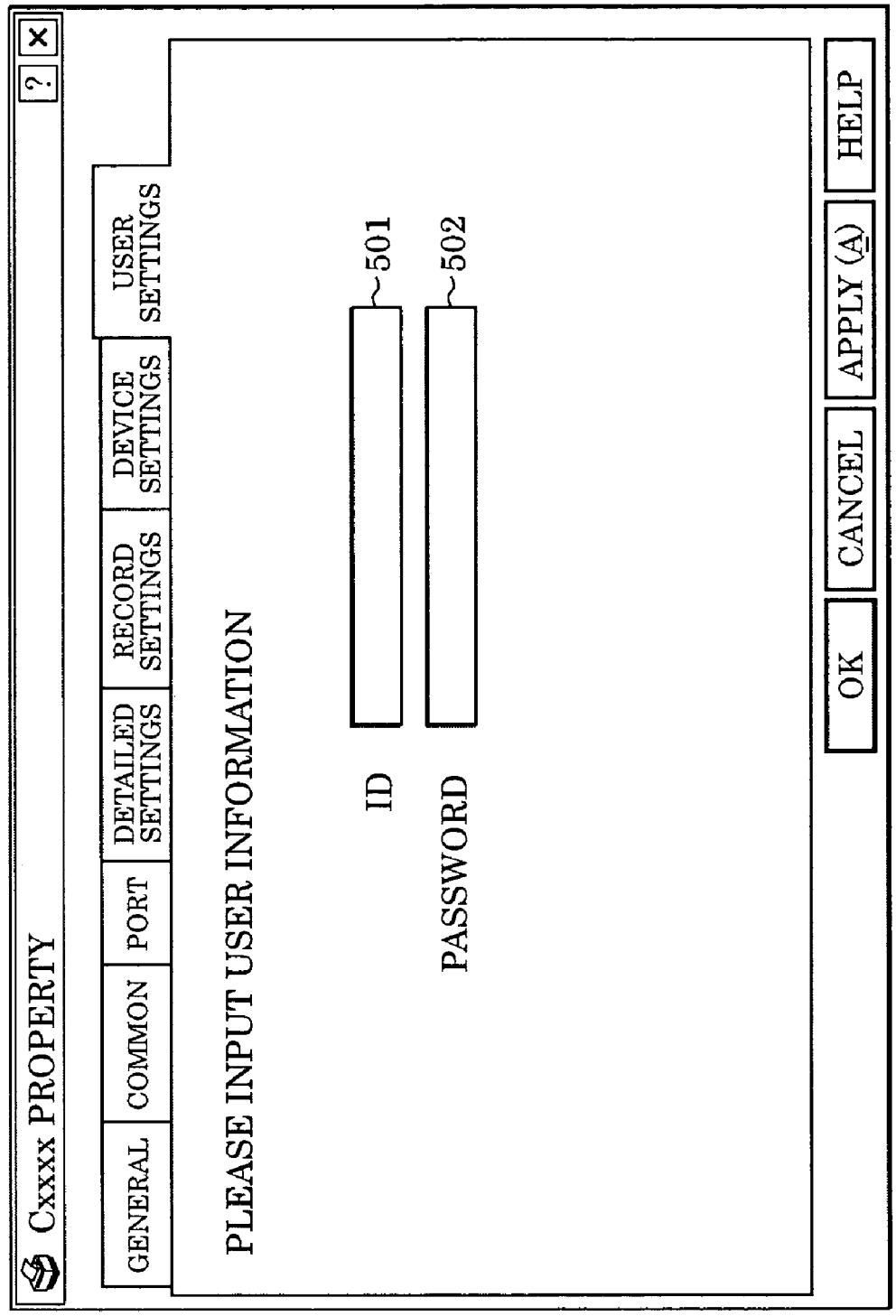
FIG. 5 illustrates an example of a print setting screen displayed on a CRT display shown in FIG. 3.

FIG. 5 illustrates an example of the print setting screen displayed on the CRT display 310, and is an example of the setting screen for the user authentication ID and password provided by the printer driver 317 shown in FIG. 3.

In the print setting screen shown in FIG. 5, the user inputs the user ID and the password into fields 501 and 502, respectively, by using the keyboard 308. Returning to the flow of FIG. 4, after inputting the authentication information, the process proceeds to step S402 to determine, by using the keyboard 308, whether the records concerning the printing operation are to be disclosed to the other users while displaying the setting screen shown in FIG. 6 on the CRT display 310.

FIG. 6 is an example of the print setting screen displayed on the CRT display 310 and is an example of the setting screen for displaying the record provided by the printer driver 317 shown in FIG. 3.

In FIG. 6, each check box is for setting whether to display record information to other users. When the user of the personal computer 102 checks a particular check box, the associated record can be viewed when the other users see the record of the printer 101.

In contrast, when the user of the personal computer 102 does not check any of the check boxes, the associated record cannot be viewed when the other users see the record of the printer 101.

More specifically, a check box 601 is for setting the document name to determine whether the document name is indicated in the record. In this embodiment, the check box 601 is not checked.

A check box 602 is for setting the user name to determine whether the user name is indicated in the record. In this embodiment, the check box 602 is checked. A check box 603 is for setting the time and date to determine whether the time and date is indicated in the record. In this embodiment, the check box 603 is checked.

A check box 604 is for setting the number of print copies to determine whether the number of print copies is indicated in the record. In this embodiment, the check box 604 is not checked. A check box 605 is for setting the output color. If the output color is displayed, information indicating whether color printing or monochromatic printing is used is indicated.

A check box 606 is for setting a printing result to determine whether the printing result is indicated in the record. In this embodiment, the check box 606 is checked.

Returning to FIG. 4, the order of steps S401 and S402, i.e., the input of authentication information and the record display setting may be reversed. In step S403, the printer driver 307 converts the application data into PDL data.

The PDL is a printer control code (language) for forming page images in a page printer, and has an extended function of printing simple characters and graphic drawing. Typical page description languages include PostScript® and printer command language (PCL).

The printer driver 317 converts application data into PDL data, and capsules the authentication information input by the user in step S401 and the record display information input by the user in step S402 and sends such information to the printer 101 as one print job.

In step S404, the personal computer 102 sends the print job to the printer 101, and the process is completed.

Software in the personal computer 102 is discussed below with reference to FIG. 7.

Figure 7:
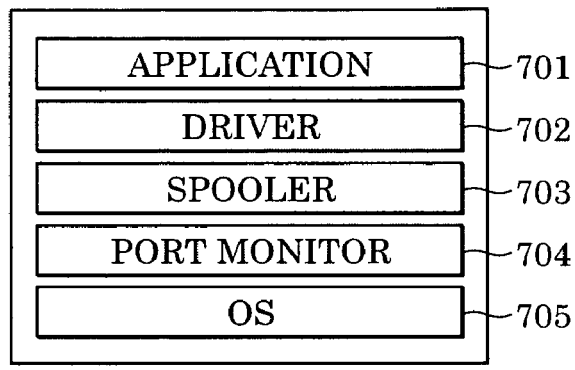
FIG. 7 illustrates a software hierarchical structure within the information processing apparatus shown in FIG. 3.

FIG. 7 illustrates a software hierarchical structure within the personal computer 102 shown in FIG. 2.

In FIG. 7, data contained in an application 701 is delivered to a driver 702. The data is then converted into PDL data and is stored in a spooler 703. The spooler 703 serves as a memory area for temporarily storing data for subsequent processing.

A port monitor 704 sends the PDL data delivered from the spooler 703 to the printer 101 via a port. The port monitor 704 creates a port for print protocols by using the interface of the OS 316 and sends capsulated data to the printer 101. The structure shown in FIG. 7 also includes an OS 705.

The print protocols include line printer daemon (LPD) and server message block (SMB). According to the above-described processing, the user operating an application on the personal computer 102 finishes processing for instructing the printer 101 to perform a printing operation.

Figure 8:
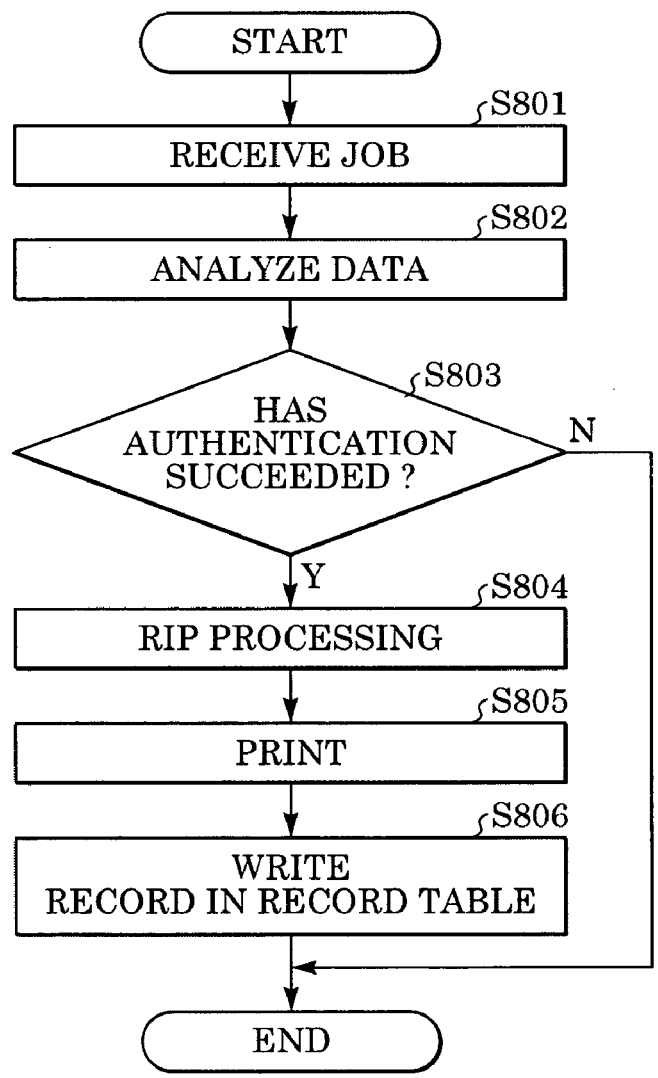
FIG. 8 is a flowchart illustrating first data processing in the printer according to the first embodiment of the present invention.

FIG. 8 is a flowchart illustrating an example of first data processing in the printer 101 according to the first embodiment of the present invention. In the processing shown in FIG. 8, when receiving a print job from the personal computer 102, the printer 101 shown in FIG. 2 authenticates the print job and performs a subsequent print process. The steps shown in FIG. 8 are implemented by reading the control program stored in the ROM 202 by the CPU 201.

In step S801, the printer 101 receives a print job from the personal computer 102 via a network. More specifically, the printer control software 212 of the printer 101 operates print services and can perform communication with print clients to receive print jobs.

In step S801, the printer 101 receives the print job sent from the personal computer 102 in step S404 shown in FIG. 4.

Then, in step S802, the printer control software 212 of the printer 101 analyzes the data of the received print job and extracts the authentication data, record setting data, and PDL data. The printer control software 212 then temporarily stores the extracted data in the storage area of the RAM 303.

Then, in step S803, the printer control software 212 extracts the user ID from the print job and determines whether the user ID has been registered in the printer 101, i.e., whether authentication has succeeded.

If it is determined in step S803 that the user ID has not been registered in the printer 101, it means that authentication has failed, and the user is not allowed to use the printer 101. Thus, the print job processing is discontinued, and the process is then terminated.

If the printer control software 212 determines in step S803 that the user ID has been registered in the printer 101, password authentication is conducted. The printer control software 212 extracts the password from the print job and checks whether the extracted password coincides with the password registered in the printer 101. If the two passwords are different, the user is not allowed to use the printer 101, and the print job processing is discontinued, and the process is then terminated. If the authentication in step S803 succeeds, flow proceeds to step S804.

In step S804, raster image processing (RIP) is started. The RIP processing is performed for outputting PDL data from a printer, and for converting mathematical numeric information into pixel information (raster data) that can be identified (processed) by the printer. As a result of the RIP processing, high-quality dot-unit printing can be implemented.

After the RIP processing, in step S805, printing processing is started. More specifically, the raster-data print job is sent to the engine controller 205, and the engine controller 205 controls the engine 204 to start printing.

If the printing operation has been normally finished, the engine controller 205 returns a code indicating that information to the printer control software 212. If the printing operation has been abnormally finished, the engine controller 205 returns a code indicating that information to the printer control software 212.

After completing this processing, in step S806, the printer control software 212 stores the print job as a record.

More specifically, in step S806, the printer control software 212 stores the record of the print job in the record table 214 reserved in the hard disk drive 208 shown in FIG. 2.

In this embodiment, the record table 214 is a virtual area for storing the statuses of processing to form a processing task of the printer 101 into a record. There are eight items of information to be stored in the record table 214: a) user; b) processing task; c) document name; d) user name; e) time and date; f) number of print copies; g) color processing; and h) result.

The printer control software 212 records the above-described eight items of information in the record table 214 by adding flags indicating whether the individual items are disclosed to other users. When an item is disclosed to the other users, the flag indicates 1, and when the item is not disclosed to the other users, the flag indicates 0.

The printer control software 212 stores the eight items of record information in the record table 214 by referring to the record setting information extracted in step S802. In this embodiment, details of the eight items recorded are as follows, where the numbers in the parentheses indicate flags. Since a) user and b) processing task are not recorded, flags are not indicated.

a) user: XXXX
b) processing task: print job
c) document name: Test.txt (0)
d) user name: XXXX (1)
e) time and date: 22:00/11/28/2003 (1)
f) number of print copies: 4 (0)
g) color processing: color: (1)
h) result: 1 (1)

The printer control software 212 writes the above-described items of information into the record table 214. Then, the processing for receiving the print job and for writing the record by the printer 101 is completed.

Figure 9:
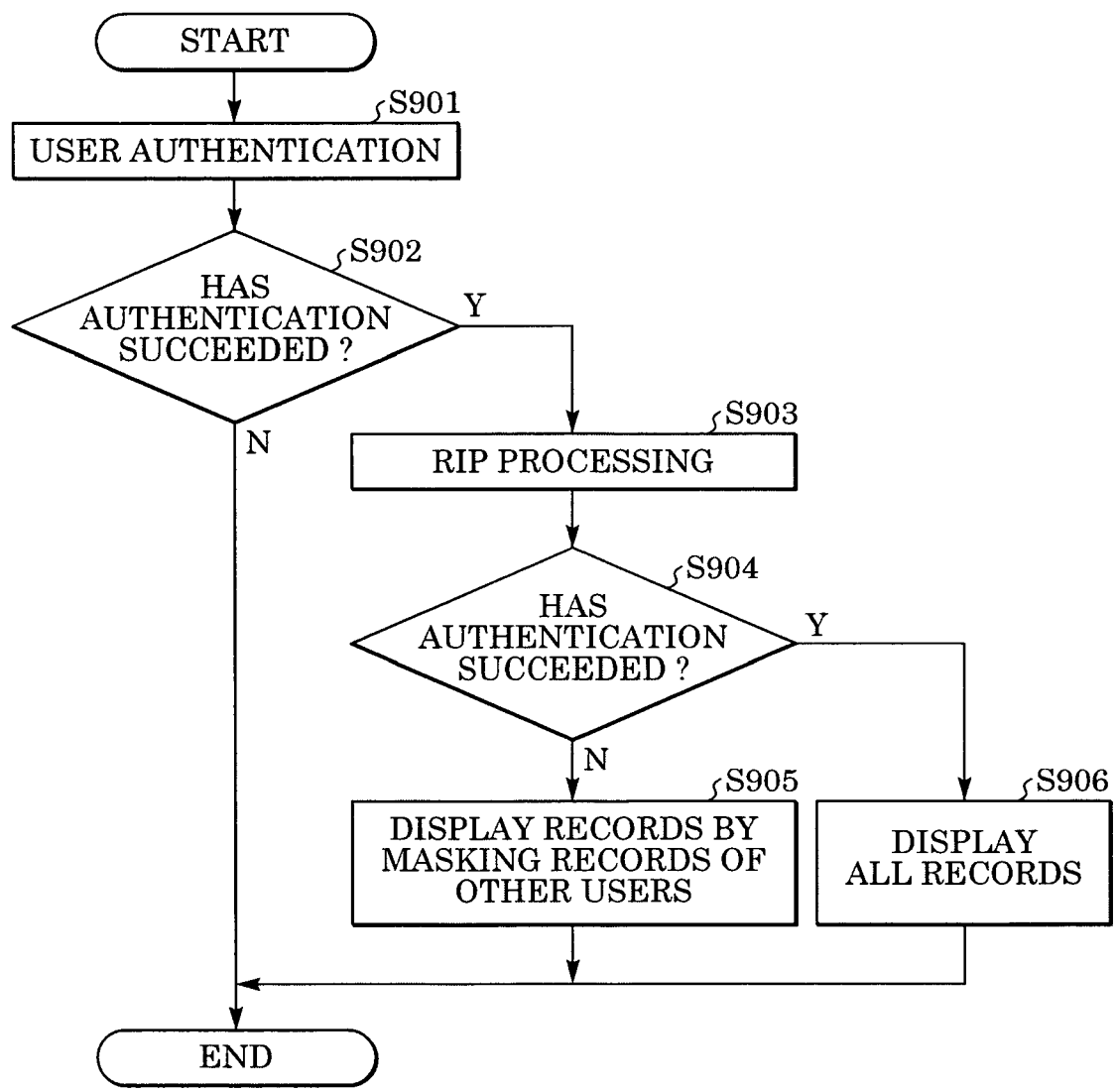
FIG. 9 is a flowchart illustrating second data processing in the printer according to the first embodiment of the present invention.

FIG. 9 is a flowchart illustrating an example of second data processing in the printer 101 according to the first embodiment of the present invention. In this processing, the processing for displaying the record when the user of the printer 101 shown in FIG. 2 checks the record by using the panel 206 of the printer 101 is performed. The steps of FIG. 9 are executed by the printer control software 212.

In step S901, a user of the personal computer 102 operates the GUI displayed on the panel 206 of the printer 101 to conduct user authentication.

Figure 10:
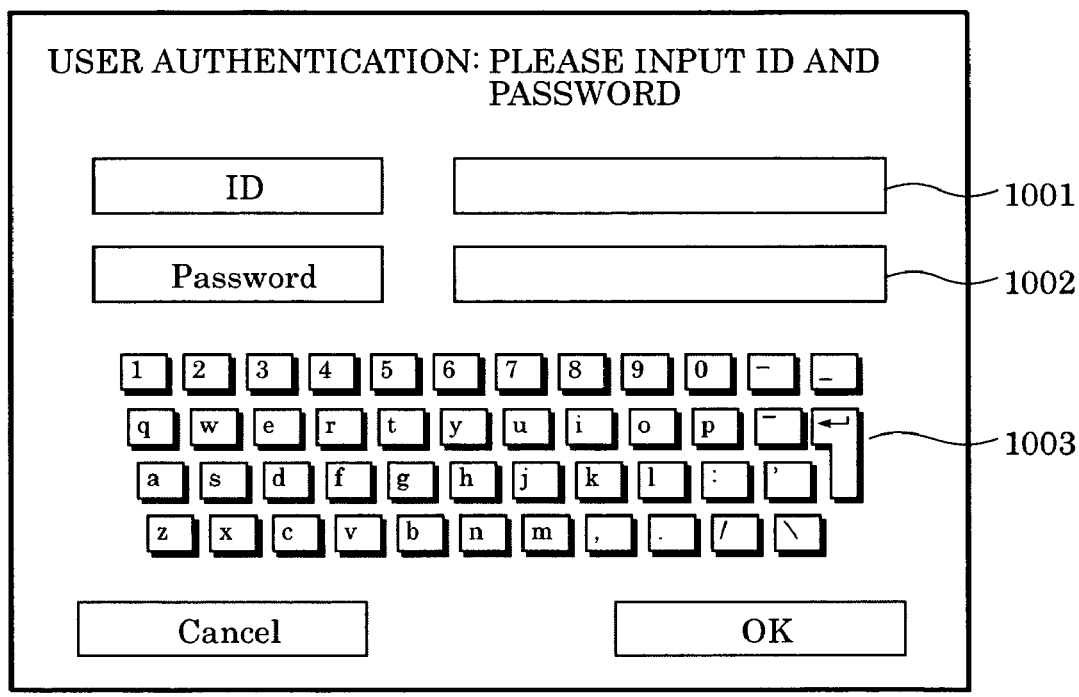
FIG. 10 illustrates an example of a user authentication screen displayed on a panel of the printer shown in FIG. 2.

FIG. 10 illustrates an example of the user authentication screen displayed on the panel 206 shown in FIG. 2. The printer 101 always displays the screen shown in FIG. 10 when the printer 101 is not being used by a user. When a user uses the printer 101, authentication must be conducted.

In FIG. 10, a user ID and a password are input into fields 1001 and 1002, respectively. A GUI 1003 indicates a software keyboard and is used for inputting the ID and password. The user inputs the ID and password on this screen.

Returning to FIG. 9, in step S902, it is determined whether the ID and password input in step S901 are correct, i.e., whether authentication has succeeded. If it is determined in step S902 that authentication has failed, the user is not allowed to use the functions of the printer 101, and the process is terminated.

If it is determined in step S902 that the ID and password input in step S901 are correct, i.e., that authentication has succeeded, the user is authenticated, and the process proceeds to step S903.

In this embodiment, it is presumed that the user ID and password are XXXX and YYYY, respectively, and that authentication has succeeded.

Then, in step S903, the user selects the record display function from a function list of the printer 101 on the panel 206, and performs RIP processing.

In this embodiment, since the printer 101 is an MFP, it has a plurality of functions, such as a copy function, a print function, a scan function, a facsimile function, and a send function, which can be operated on the GUI of the panel 206.

Then, the user selects a record display menu of the print job record from menus displayed on the panel 206. When the record display menu is selected, in step S904, the printer control software 212 checks whether the currently logged-in user is the administrator. In this case, since the user is not the administrator, flow proceeds to step S905, where the record is displayed in the general user mode (i.e., information concerning other users is masked), and the processing is completed.

If it is determined in step S904 that the currently logged-in user is the administrator, the process proceeds to step S906. In step S906, the printer control software 212 displays all record information of the print jobs regardless of the settings of the users, and the processing is completed.

In this embodiment, in displaying the record in the general user mode, if the person processing the job is the currently logged-in user, all items of information concerning the job are displayed without any restriction, and if another user has processed the job, the information concerning the job is displayed according to the record settings made by that user.

FIG. 11 illustrates an example of a first record information display screen displayed on the panel 206 shown in FIG. 2. In this example, a list is displayed on the panel 206 under the control of the printer control software 212 (print job records displayed on the panel 206 when the user checks the records).

In FIG. 11, in a job record 1101, the document name is "Data.txt" and the user name is "Test" (hereinafter referred to as "user Test"). The columns representing the time and date, the number of print copies, and the color are indicated by "****" to mask the actual data. Any other symbol can be used to mask the data. The reason for masking certain data is that the user Test has made the record display settings in the setting screen shown in FIG. 6 when sending the print job "Data.txt" such that those items of information are not disclosed to other users.

In a job record 1102, the document name is "Test.txt", and the user name is Cxxxx. The job record 1102 is associated with the print job sent by the user in the flowchart of FIG. 4. In this print job, since the user name Cxxxx is the currently logged-in user, all the items of record information are displayed without being masked.

In a job record 1103, the document name is masked by "**". The user name is Yamada (hereinafter referred to as the "user Yamada"), and the document name and the time and date are indicated by "**". The reason for this is that the user Yamada has made the record display settings in the setting screen shown in FIG. 6 when sending the print job such that those items of information are not disclosed to other users.

In this manner, all the items of the record of the currently logged-in user are displayed, and the records of the other users are displayed according to the record display rules set by such users.

The processing when it is determined in step S904 that the user currently logging in the printer 101 is the administrator is discussed below.

Although in this embodiment the currently logged-in user is not the administrator, it is assumed that the administrator checks records similar to records shown in FIG. 11.

FIG. 12 illustrates an example of a second record information display screen displayed on the panel 206. In this example, a list is displayed on the panel 206 under the control of the printer control software 212.

In FIG. 12, a record 1201 is a print job similar to that of the record 1101 shown in FIG. 11. The record 1201 is different from the record 1101 in that all the items of the record are displayed without being masked.

Although items indicating the time and date, the number of print copies, and the color are masked in the record 1101 in FIG. 11, they are displayed in the administrator viewing mode in FIG. 12.

Similarly, in records 1202 and 1203, all items of record information are displayed without being masked. Accordingly, masking of records, which may cause the administrator problems in controlling the records, can be prevented, while unnecessary information is not displayed for general users.

Some items of information in the records 1201, 1202, and 1203 are underlined. These are items that have been set by the senders of the print jobs in the records 1201, 1202, and 1203, i.e., by the user Test, the user Cxxxx, and the user Yamada, on the printer driver 317 when sending the print jobs such that they are not displayed. This enables the administrator to check which items are disclosed and which items are not disclosed to general users.

For the next example, it is presumed that the user Yamada is logged onto the printer 101 to check the records.

FIG. 13 illustrates an example of a third record information display screen displayed on the panel 206 shown in FIG. 2. In this example, a list is displayed on the panel 206 under the control of the printer control software 212. Although in the example shown in FIG. 13, the job records having results OK and NG are displayed on the same list, an OK list and an NG list may be separately managed and displayed as different records.

When the user Yamada is logged onto the printer 101, only the items of the print job record of the user Yamada are displayed without being masked, while some items of the records of the other users are masked.

In FIG. 13, since a record 1301 is a print job record by the user Test, it is displayed according to the rules set by the user Test. The record 1301 displayed for the user Yamada is the same as that displayed for the user Cxxxx. More specifically, the record 1301 is the same as the record 1101 shown in FIG. 11.

In a record 1302, however, since the print job sender of the record 1302 is the user Cxxxx, the record 1302 is displayed according to the rules set in step S402 of FIG. 4 by the user Cxxxx. That is, the name of the document and the number of print copies are masked by "****", and the user name, the time and date, the color, and the result are displayed.

Since a record 1303 is the print job record sent by the user Yamada, all the items are displayed without being masked.

Second Embodiment

In the first embodiment, the user sets a record for a print job on the setting screen shown in FIG. 6 by using the personal computer 102 shown in FIG. 3. Then, in response to an instruction from the panel 206 of the printer 101, the record information is displayed in a display mode, i.e., the general user mode or the administrator viewing mode, according to whether the person who has given the instruction is the user who has set the record, or another user, or the authorized administrator. The record processing is not restricted to print jobs, and records can be displayed for all the functions provided by, for example, an MFP. In a second embodiment of the present invention, after setting a document on the scanner 217 of the printer 101 and sending data by facsimile or mail, the user checks a scan record by using the personal computer 102.

More specifically, in the second embodiment, an authorized user uses the scan function of the printer 101 by using the panel 206 shown in FIG. 2, and then checks a scan-sending record by using the personal computer 102.

In the second embodiment, the printer 101 and the environments around the user are as those shown in FIG. 1. Detailed configurations of the printer 101 and the personal computer 102 are the same as those shown in FIGS. 2 and 3, respectively.

Figures 14, 15:
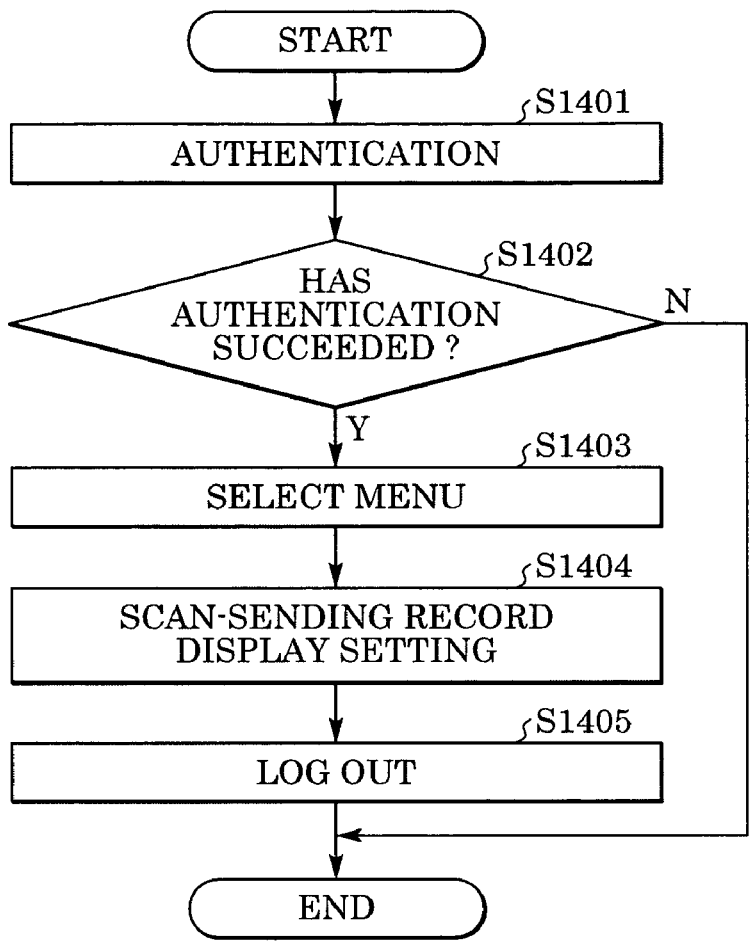
FIG. 14 is a flowchart illustrating third data processing in the printer according to a second embodiment of the present invention.
FIG. 15 illustrates an example of a scan-record display setting screen displayed on the panel shown in FIG. 2.

FIG. 14 is a flowchart illustrating an example of third data processing in the printer 101 according to the second embodiment of the present invention. In this processing, the user sets a scan-sending record in the printer 101. The steps of FIG. 14 are executed under the control of the printer control device 212.

First, in step S1401, the user authentication screen shown in FIG. 10 is displayed on the panel 206, and the user inputs the ID and password. Then, in step S1402, it is determined whether the input ID and password are correct, i.e., whether authentication has succeeded. If it is determined in step S1402 that the input ID and password are not correct, it means that authentication has failed, and the user cannot use the function of the printer 101. The process is then terminated.

If it is determined in step S1402 that the input ID and password are correct, the user is authenticated, and the process proceeds to step S1403.

In step S1403, the user selects a record display function from a function list of the printer 101.

Since the printer 101 is an MFP, it has a plurality of functions, such as a copy function, a print function, a scan function, a facsimile function, and a send function, which can be operated on the GUI of the panel 206 shown in FIG. 2.

In order to set a scan-setting record, the user selects a scan-sending record display setting screen from a menu displayed on the GUI of the panel 206.

Then, in step S1404, the user performs scan-sending record display settings.

FIG. 15 illustrates an example of the scan-sending record display setting screen displayed on the panel 206 shown in FIG. 2 under the control of the printer control software 212.

In FIG. 15, an item 1601 is used for setting whether a transmission protocol is indicated in the record.

An item 1602 is used for image format setting to determine whether the image format is indicated in the record. An item 1603 is used for data size setting to determine whether the data size is indicated in the record. An item 1604 is used for document name setting to determine whether the document name is indicated in the record. An item 1605 is used for result setting to determine whether the result is indicated in the record. Details of the scan function of the printer 101 are discussed below. Returning to FIG. 14, in step S1405, the user logs out from the scan-setting function, and the processing is completed.

Figure 16:
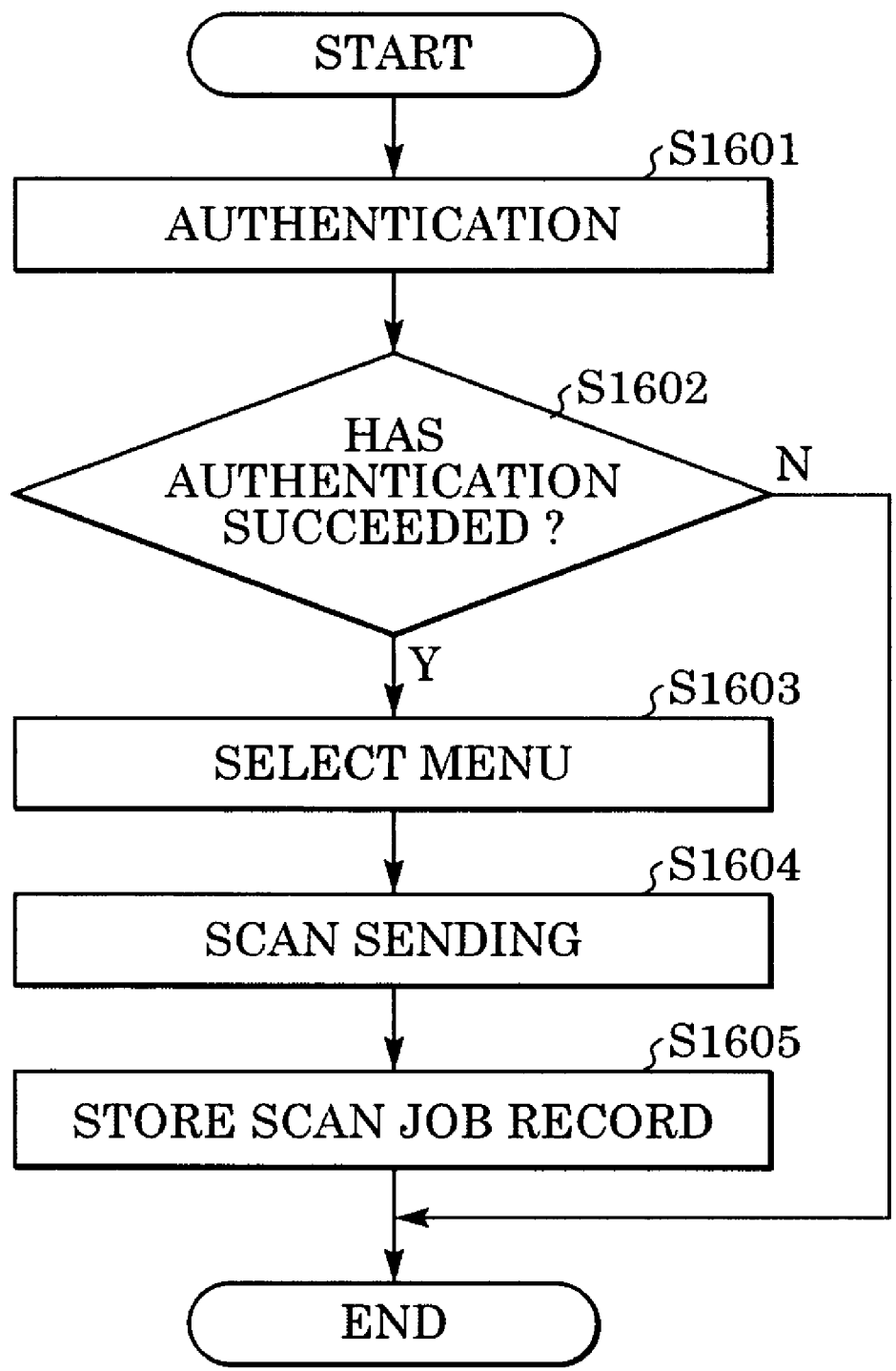
FIG. 16 is a flowchart illustrating fourth data processing in the printer according to the second embodiment of the present invention.

FIG. 16 is a flowchart illustrating an example of fourth data processing in the printer 101 according to the second embodiment of the present invention. In this processing, a user uses a scanned-image sending function of the printer 101. The steps of FIG. 16 are executed under the control of the printer control software 212.

In this embodiment, the scanned-image sending function is to send image data scanned by the scanner 217 to other devices via a network. The protocol, such as file transfer protocol (FTP), e-mail, or SMB, used in network communication can be selected by the user.

First, in step S1601, the user operates the GUI (see the screen shown in FIG. 10) displayed on the panel 206 of the printer 101 to conduct user authentication.

More specifically, the user inputs the ID and password by operating the software keyboard shown in FIG. 10. Then, in step S1602, it is determined whether the input ID and password are correct, i.e., whether authentication has succeeded. If it is determined in step S1502 that the input ID and password are not correct, it means that authentication has failed, and the user cannot use the function of the printer 101. The process is then terminated.

If it is determined in step S1602 that the input ID and password are correct, authentication has succeeded, and the process proceeds to step S1603.

In step S1603, the user selects a record display function from a function list of the printer 101. Since the printer 101 is an MFP, it has a plurality of functions, such as a copy function, a print function, a scan function, a facsimile function, and a send function, which can be operated on the GUI of the panel 206 shown in FIG. 2.

The user selects the scanned-image sending function from a menu displayed on the panel 206. Then, in step S1604, the user scans and sends a document. More specifically, the user sets a document on the scanner 217 and specifies the address of a destination device and the protocol on the GUI of the panel 206.

For discussion purposes, it is presumed that the document is to be sent to the personal computer 102 by using the SMB protocol. When starting scanning, the image data is converted into a prescribed print format and is sent to the personal computer 102 by the SMB protocol. Simultaneously, the printer control software 212 writes the transmission protocol, the image format, the data size, the document name, and the transmission result into the memory. Then, in step S1605, the printer control software 212 stores the record of this scan job in the record table 214, and the processing is then completed.

The record table 214 is a virtual area for storing the statuses of processing to form a processing task of the printer 101 into a record. There are seven items of information to be stored: a) user; b) processing task; c) protocol; d) image format; e) data size; f) document name; and g) result.

The printer control software 212 records the above-described seven items of information in the record table 214 by adding flags indicating whether the individual items are disclosed to other users. When an item is disclosed to the other users, the flag indicates 1, and when the item is not disclosed to the other users, the flag indicates 0.

The printer control software 212 stores the seven items of record information in the record table 214 by referring to the record setting information set in step S1404. In this embodiment, details of the seven items recorded are as follows, where the numbers in the parentheses indicate flags. Since a) user and b) processing task are not recorded, flags are not indicated.

a) user: XXXX
b) processing task: scanned-image sending
c) protocol: FTP (1)
d) image format: JPEG (0)
e) data size: 58000 (0)
f) document name: Scan.JPEG (1)
g) result: 1 (OK) (1)

The printer control software 212 writes those items of information into the record table 214. Then, the scanned-image sending processing by the printer 101 is completed.

Figure 17:
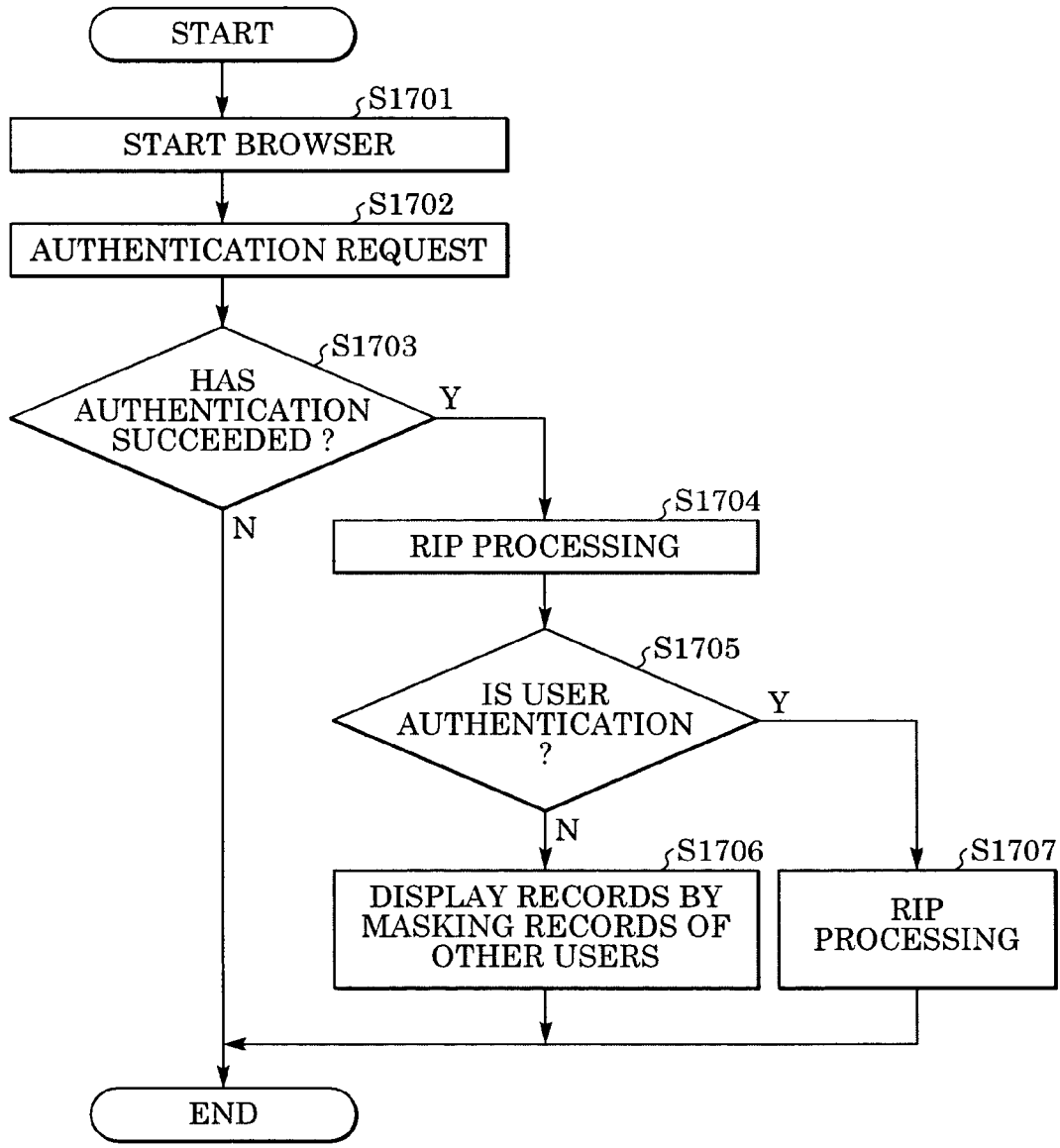
FIG. 17 is a flowchart illustrating an example of second data processing in the information processing apparatus according to the second embodiment of the present invention.

FIG. 17 is a flowchart illustrating an example of second data processing in the information processing apparatus according to the second embodiment of the present invention. In this processing, the record is displayed by using the web browser 315A shown in FIG. 3, and more specifically, the user or the administrator accesses the printer 101 by using the web browser 315A and checks the scanned-image sending record.

In step S1701, the user operates the OS 316 of the personal computer 102 to start the web browser 315A.

Since the web server software 216 is installed in the printer 101, it has the function of setting the printer 101 via the web and disclosing the records to other devices on the web.

The user inputs the uniform resource locator (URL) into the input column of the web browser 315A of the personal computer 102 to access the web server software 216 of the printer 101.

Then, in step S1702, after checking that access has been correctly performed, the web server software 216 sends an authentication request.

As in authentication using the panel 206 of the printer 101, authentication performed in this processing is to obtain a right to use the function of the printer 101 by inputting the ID and password of the user by operating the keyboard 308.

The web browser 315A displays a page (not shown) that instructs the user to input the ID and password on the CRT display 310 as a GUI, and the user inputs the ID and password by operating the keyboard 308. The input information is transferred to the printer 101 via the HTTP protocol and the authentication software 215 conducts authentication for the transferred information by comparing it with predetermined data.

The authentication result is returned from the printer 101 to the personal computer 102 by using the HTTP protocol.

In step S1703, the web browser 315A determines whether authentication has succeeded. If authentication has failed, a message indicating the failure of authentication is displayed on the web browser 315A, and the process is terminated.

If it is determined in step S1703 that authentication has succeeded, the web server software 216 sends a file for displaying a menu of the printer 101 to the personal computer 102.

In the present example, it is presumed that the authentication information sent by the user is correct, and thus, authentication has succeeded and flow continues to step S1704.

In step S1704, the file for displaying a menu is sent from the printer 101, and RIP processing is performed on the file so that a GUI for selecting the menu of the printer 101 is displayed on the web browser 315A.

The user then selects a record display function from a function list of the printer 101 displayed on the web browser 315A.

Since the printer 101 is an MFP, it has a plurality of functions, such as a copy function, a print function, a scan function, a facsimile function, and a send function, which can be operated on the GUI of the web browser 315A.

Next, in step S1705, the user selects a display menu of a scan-sending record from a menu displayed on the web browser 315A, and then, the printer control software 212 checks whether the currently logged-in user is the administrator. If the user is not the administrator, the process proceeds to step S1706, where the record is displayed in the general user mode. The processing is then completed.

In displaying the record in the general user mode, if the person processing the job is the currently logged-in user, all items of information concerning the job are displayed without any restriction. If another user has processed the job, the information concerning the job is displayed according to the record settings made by that the other user.

Figure 18:
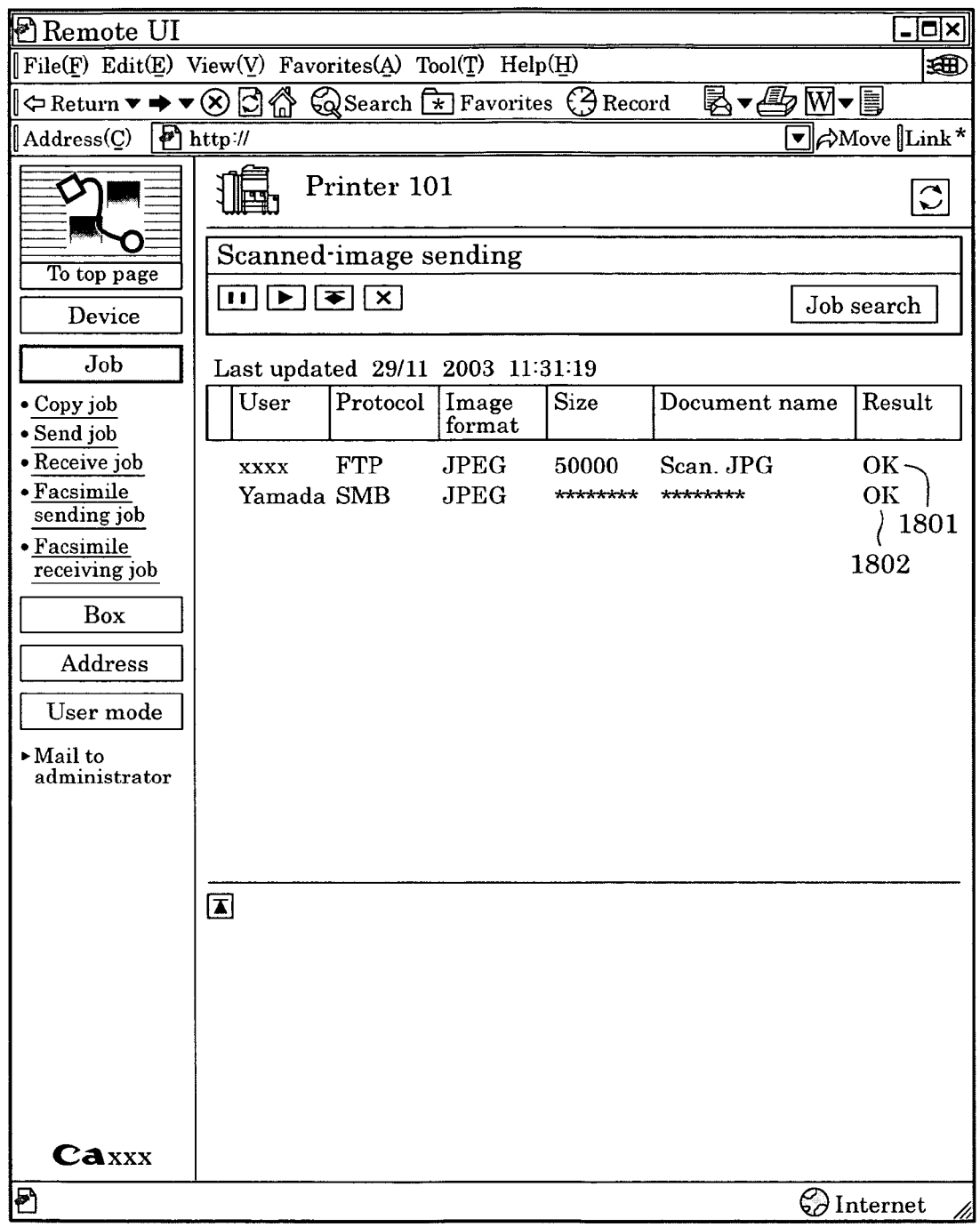
FIG. 18 illustrates an example of a scan-sending record screen displayed on the CRT display shown in FIG. 3.

FIG. 18 illustrates an example of the scan-sending record screen displayed on the CRT display 310 shown in FIG. 3. In this example, the record displayed on the CRT display 310 by the web browser 315A when the user checks the scan-sending record is shown.

In FIG. 18, in a job record 1801, the user is XXXX, and the job record 1801 is associated with the scan job sent by the user in the flowchart of FIG. 16. In this scan job, since the user XXXX coincides with the currently logged-in user, all items of the record information are displayed without being masked.

That is, all the items, such as the user, protocol, image format, size, document name, and result, are disclosed.

In a job record 1802, the user is Yamada. Since Yamada is a different user from the currently logged-in user XXXX, the record information is displayed according to the rules set by the user Yamada.

More specifically, the size and the document name are masked by "****". That is, the user Yamada has made record display settings such that the size and the document name are not disclosed.

Figure 19:
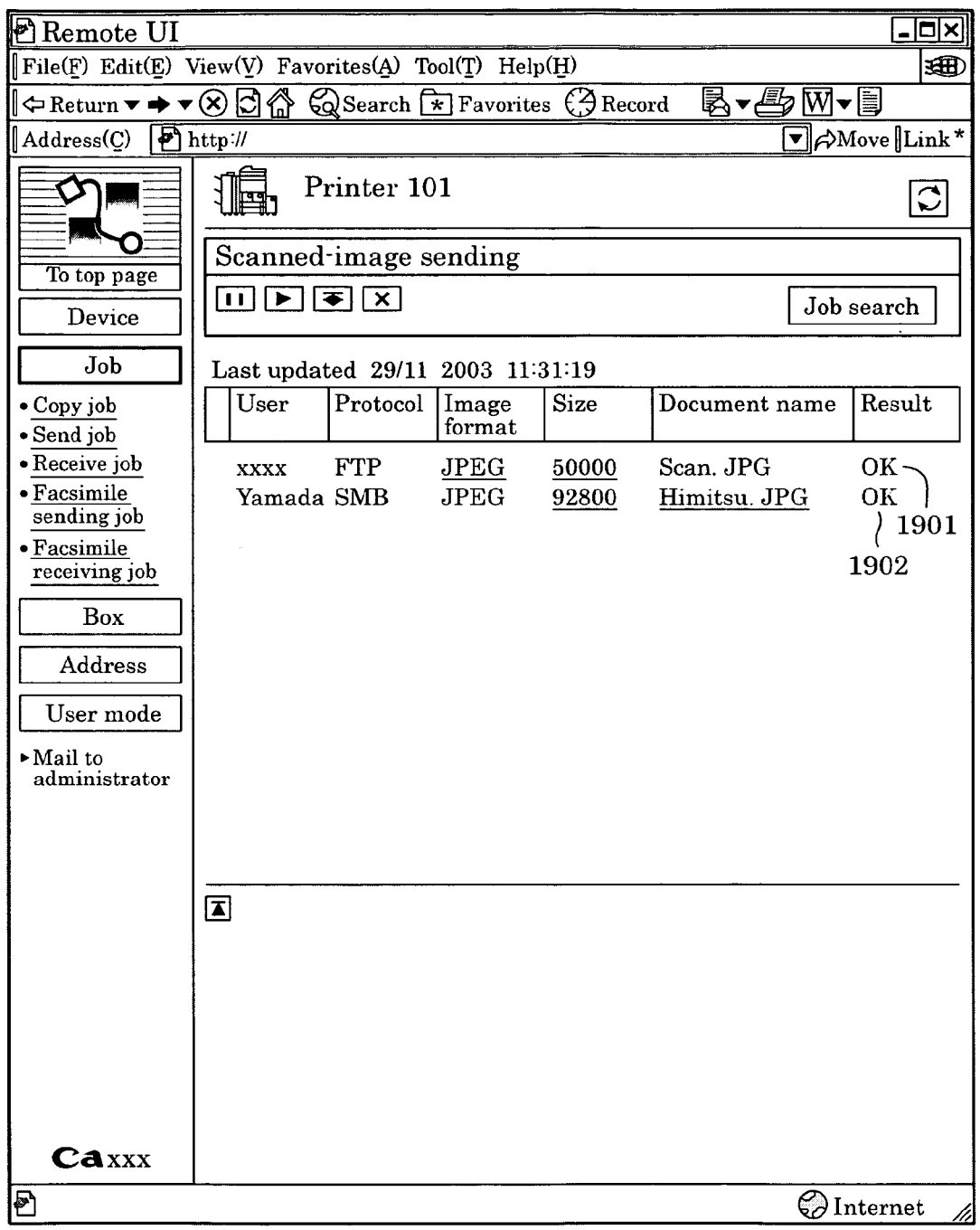
FIG. 19 illustrates another example of the scan-sending record screen displayed on the CRT display shown in FIG. 3.

Returning to FIG. 17, if it is determined in step S1705 that the user is the administrator, the process proceeds to step S1707. In step S1707, RIP processing is performed on the obtained file, and the scan-sending record screen shown in FIG. 19 is displayed. The processing is then completed.

Details of processing when the logged-in user is the administrator in step S1707 are given below. Although in this embodiment the currently logged-in user is not the administrator, it is presumed that the administrator checks records similar to records shown in FIG. 18.

FIG. 19 illustrates an example of the scan-sending record screen displayed on the CRT display 310 shown in FIG. 3. In this example, the record displayed on the CRT display 310 by the web browser 315A shown in FIG. 3 when the administrator checks the scan-sending record is shown.

The record 1801 shown in FIG. 18 and the record 1901 shown in FIG. 19 are the same scanned-image sending job. The record 1802 shown in FIG. 18 and the record 1902 shown in FIG. 19 are also the same scanned-image sending job.

In the display example shown in FIG. 19, unlike the display example when the user XXXX checks the records as shown in FIG. 18, all the items of records are displayed without being masked in response to a request to check the records from the administrator.

For example, in the record 1802, the size and the document name are masked. In the administrator viewing mode, however, all the items of records are displayed without being masked.

Accordingly, masking of records, which may cause problems for the administrator in controlling records, can be prevented, and unnecessary information is not displayed for general users.

Some items of information in the records 1901 and 1902 are underlined. These items are items that have been set by the senders of the scanned-image sending jobs in the records 1901 and 1902, i.e., by the user XXXX and the user Yamada, on the printer driver 317 when sending the scanned-image sending jobs such that they are not displayed. This enables the administrator to check which items are disclosed and which items are not disclosed to general users.

A description is now given, with reference to a memory map shown in FIG. 20, of the configuration of a data processing program readable by a print system including the information processing apparatus and the printer according to an embodiment of the present invention.

The memory map shown in FIG. 20 is contained in a storage medium storing various data processing programs readable by the print system, including the information processing apparatus and the printer according to an embodiment of the present invention.

The memory map may further include information for managing a set of programs stored in the storage medium, for example, version information and creator information, information dependent on the OS of the program reader, i.e., the print system, and icons for identifying the programs, though such information is not shown in FIG. 20.

Additionally, the above-described memory map may contain data dependent on the various programs, programs for installing the above-described programs into a computer, and, if programs to be installed are compressed, programs for decompressing such programs are also contained.

In the present invention, programs including the functions shown in FIGS. 4, 8, 9, 14, 16, and 17 in the first and second embodiments may be installed from an external source and be executed by a host computer. In this case, a set of information contained in the programs may be supplied to an output device from a storage medium such as a compact disc read only memory (CD-ROM), a flash memory, or a floppy disk (FD), or from an external storage medium via a network.

As described above, in the present invention, a storage medium storing software program codes implementing the functions of the above-described embodiments may be supplied to a system or a device, and a computer (or a CPU or a micro processor unit (MPU)) of the system or the device may read and execute the program codes stored in the storage medium.

In this case, the program codes themselves read from the storage medium implement novel functions of an embodiment of the present invention, and the storage medium storing such program codes constitutes an embodiment of the present invention.

As long as program functions are included, the format of the programs is not restricted, and it may be object codes, a program executed by an interpreter, or script data supplied to an OS.

The storage medium storing the programs may be a floppy disk, a hard disk, an optical disc, a magneto-optical disk, a CD-ROM, a CD-Recordable (CD-R), a CD-ReWritable (CD-RW), magnetic tape, a non-volatile memory card, a ROM, or a digital versatile disc (DVD).

In this case, the program codes themselves read from the storage medium implement the functions of the above-described embodiments of the invention, and the storage medium storing such program codes constitutes an embodiment of the present invention.

The programs may be supplied as follows. By connecting to an Internet homepage using a browser of a client computer, the computer programs of an embodiment of the present invention or compressed files containing an automatic installing function may be downloaded from the homepage to a recording medium, such as a hard disk. Alternatively, the program codes forming the programs of an embodiment of the present invention may be divided into a plurality of files, and those files may be downloaded from different homepages. That is, a world wide web (WWW) server or an FTP server for allowing a plurality of users to download the program files implementing the functions of an embodiment of the present invention by using a computer are contained within the scope of the invention.

The programs of an embodiment of the present invention may be encrypted and stored in a storage medium, such as a CD-ROM, and then distributed to users. Then, only users that satisfy predetermined conditions are allowed to download key information for decrypting the programs from a homepage via the Internet, and the downloaded programs are executed by using the key information to install them to a computer.

As stated above, the functions of the above-described embodiments are implemented by executing the program codes read by a computer, and may also by implemented by executing part of or the entirety of the processing by an OS running on a computer in response to instructions of the program codes.

Additionally, the program codes read from a storage medium may be written into a memory included in a feature expansion board inserted into a computer or a feature expansion unit connected to a computer, and then, a CPU included in the feature expansion board or the feature expansion unit may execute part of or the entirety of the processing in response to instructions of the program codes.

While the present invention has been described with reference to exemplary embodiments, it is to be understood that the invention is not limited to the disclosed embodiments. On the contrary, the invention is intended to cover various modifications and equivalent arrangements (including organic combinations of the embodiments) included within the spirit and scope of the appended claims. The scope of the following claims is to be accorded the broadest interpretation so as to encompass all such modifications and equivalent structures and functions.

As examples of such modifications, first through forty-fifth modified examples are described below.

FIRST MODIFIED EXAMPLE

In a first modified example, an image forming apparatus including job processing unit for processing predetermined different jobs is provided. The job processing unit can perform a print function by the engine 204, a copy function by the scanner 217 and the engine 204, a scanner function by the scanner 217, and a device sending/receiving function by the network interface card 211, and performs one of the functions by selecting it by using the panel 206. The image forming apparatus includes the following elements: record storage unit (corresponding to the record table 214 shown in FIG. 2) stores job processing records concerning the jobs processed by the job processing unit according to each job processing requester; setting unit (the display unit of the panel 206 shown in FIG. 2, for example, the setting screen shown in FIG. 6) and step S402 shown in FIG. 4) sets rules for displaying job processing record items to be displayed on an operation display unit by each job processing requester; authentication unit conducts authentication for each job processing requester when the job processing requester requests the job processing unit to process a job (for example, the authentication unit 215 authenticates information input by using the display unit of the panel 206, for example, the setting screen shown in FIG. 10 (corresponding to step S902 shown in FIG. 9)); determining unit determines an attribute of the job processing requester authenticated by the authentication unit (for example, the printer control software 212 shown in FIG. 2 executes step S904 shown in FIG. 9); and control unit displays the job processing records stored in the record storage unit on the operation display unit by differentiating a display mode based on a result obtained by the determining unit and the rules set by the setting unit (for example, the printer control software 212 shown in FIG. 2 executes steps S904 and S905 shown in FIG. 9).

According to the above-described image forming apparatus, the user authenticated to use the image forming apparatus can hide job record items that the user does not wish displayed to other users by masking them. Accordingly, the user can customize job record information items to be displayed as desired.

SECOND MODIFIED EXAMPLE

In a second modified example, there is provided an image forming apparatus including job processing unit for processing predetermined different jobs and a web server (corresponding to the web server software 216 shown in FIG. 2) for executing a web server function to display a predetermined setting screen by using a browser of an information processing apparatus that can be communicated on a network. The job processing unit can perform a print function by the engine 204, a copy function by the scanner 217 and the engine 204, a scanner function by the scanner 217, and a device sending/receiving function by the network interface card 211, and performs one of the functions by selecting it by using the panel 206. The image forming apparatus includes the following elements: record storage unit (corresponding to the record table 214 shown in FIG. 2) stores job processing records concerning the jobs processed by the job processing unit according to each job processing requester; setting unit (for example, the setting screen shown in FIG. 6 and step S402 shown in FIG. 4) sets rules for displaying job processing record items set by the predetermined setting screen displayed by using the browser of the information processing apparatus and to be displayed on an operation display unit by each job processing requester; authentication unit conducts authentication for each job processing requester when the job processing requester requests the job processing unit to process a job (for example, the authentication software 215 authenticates the instructions given by using the setting screen shown in FIG. 6 (corresponding to step S803 shown in FIG. 8)); determining unit determines an attribute of the job processing requester authenticated by the authentication unit (for example, the printer control software 212 shown in FIG. 2 executes step S904 shown in FIG. 9); control unit displays the job processing records stored in the record storage unit on the operation display unit by differentiating a display mode based on a result obtained by the determining unit and the rules set by the setting unit (for example, the printer control software 212 shown in FIG. 2 executes steps S904 and S905 shown in FIG. 9).

According to the above-described image forming apparatus, the user authenticated to use the image forming apparatus from the information processing apparatus, for example, a host computer, via a network can hide job record items that the user does not wish displayed to other users by masking them. Accordingly, the user can customize job record information items to be displayed as desired.

THIRD MODIFIED EXAMPLE

In a third modified example, there is provided an image forming apparatus including job processing unit for processing predetermined different jobs and a web server for executing a web server function to display a predetermined setting screen by using a browser of an information processing apparatus that can be communicated on a network. The job processing unit can perform a print function by the engine 204, a copy function by the scanner 217 and the engine 204, a scanner function by the scanner 217, and a device sending/receiving function by the network interface card 211, and performs one of the functions by selecting it by using the panel 206. The image forming apparatus includes the following elements: record storage unit (corresponding to the record table 214 shown in FIG. 2) stores job processing records concerning the jobs processed by the job processing unit according to each job processing requester; setting unit (for example, the setting screen shown in FIG. 6 and step S402 shown in FIG. 4) sets rules for displaying job processing record items set by the predetermined setting screen displayed by using the browser of the information processing apparatus and to be displayed on an operation display unit by each job processing requester; authentication unit conducts authentication for each job processing requester on the predetermined setting screen displayed by using the browser of the information processing apparatus when the job processing requester requests the job processing unit to process a job (for example, the authentication software 215 authenticates the instructions given by using the setting screen shown in FIG. 6 (step S803 shown in FIG. 8)); determining unit determines an attribute of the job processing requester authenticated by the authentication unit (for example, the printer control software 212 shown in FIG. 2 executes step S904 shown in FIG. 9). The web server can display the job processing records stored in the record storage unit on the predetermined setting screen displayed by using the browser of the information processing apparatus by differentiating a display mode based on a result obtained by the determining unit and the rules set by the setting unit (corresponding to the display examples shown in FIGS. 18 and 19 on the information processing apparatus by using the web browser 315).

According to the above-described image forming apparatus, the user authenticated to use the image forming apparatus from the information processing apparatus, for example, a host computer, via a network can hide job record items that the user does not wish displayed to other users by masking them on the screen of the information processing apparatus by using the browser. Accordingly, the user can customize job record information items to be displayed as desired.

FOURTH MODIFIED EXAMPLE

In the image forming apparatus according to any one of the first through third modified examples, the attribute determined by the determining unit indicates a right given to each job processing requester (in this modified example, the user right set by general users and the administrator right exceeding the right of general users).

With this arrangement, it can be determined whether a job processing requester to use the image forming apparatus is a general user or the administrator, thereby switching the job record display mode.

FIFTH MODIFIED EXAMPLE

In the image forming apparatus according to any one of the first through third modified examples, when the determining unit determines that the attribute of the job processing requester is exclusive, and more specifically, that the attribute corresponds to the administrator right that can change the records set by the general users in excess of the right of the general users, the control unit invalidates the rules set by each job processing requester and displays all the job processing record items on the operation display unit.

With this arrangement, it can be determined whether a job processing requester to use the image forming apparatus is a general user or the administrator. Then, if the job processing requester is the administrator, the job record display mode can be forcefully changed to display record items set by the user that they are displayed by being masked.

SIXTH MODIFIED EXAMPLE

In the image forming apparatus according to any one of the first through third modified examples, when the determining unit determines that the attribute of the job processing requester is non-exclusive, the control unit reflects the rules set by each job processing requester and displays some of the job processing record items on the operation display unit (corresponding to the display screen shown in FIG. 13 on the panel 206 shown in FIG. 2) by being masked (indicated by "****" in the example shown in FIG. 13).

With this arrangement, if the job processing requester to use the image forming apparatus is a general user, all the job processing record items of the user can be displayed, while the record items of the other users can be displayed according to the rules set by those users.

SEVENTH MODIFIED EXAMPLE

In the image forming apparatus according to any one of the first through third modified examples, the predetermined different jobs processed by the job processing unit include print function processing (print function by the engine 204 shown in FIG. 2), scanner function processing (scanner function by the scanner 217), copy function processing (copy function by the scanner 217 and the engine 204), and data sending function processing (data sending/receiving function by the network interface card 211).

In the above-described functions, record items determined not to be displayed by a user are masked on the panel 206, thereby preventing other users from specifying such record items.

EIGHTH MODIFIED EXAMPLE

In an eighth modified example, there is provided an information processing apparatus for obtaining information concerning a predetermined setting screen from a server function provided for an image forming apparatus and for displaying the information concerning the predetermined setting screen on display unit via a browser, which is the web browser 315 shown in FIG. 3 to communicate with the web server software 216 of the image forming apparatus via a network according to predetermined protocols. The information processing apparatus includes the following elements: input unit (for example, the keyboard 308 shown in FIG. 3) inputs authentication information for specifying a job processing requester by using the predetermined setting screen (for example, the screen shown in FIG. 5) when the job processing requester makes a job processing request; setting unit sets, after conducting authentication based on the input authentication information, rules for displaying job processing record items on an operation display unit of the image forming apparatus by using the predetermined setting screen by the job processing requester (for example, the printer driver 317 shown in FIG. 3 sets the rules by using the setting screen). The browser obtains job processing record information determined by the image forming apparatus according to the rules set by the setting unit, and displays the job processing records of each job processing requester on the predetermined setting screen by differentiating a display mode.

According to the above-described information processing apparatus, the user authenticated to use the image forming apparatus from the information processing apparatus, such as a host computer, via a network can hide some of the job processing record items that the user does not wish displayed to other users by masking them on the screen of the information processing apparatus by using the browser. Accordingly, the user can customize job record information items to be displayed as desired.

NINTH MODIFIED EXAMPLE

In a ninth modified example, there is provided a job display control method for an image forming apparatus including job processing unit for processing predetermined different jobs and record storage unit for storing job processing records concerning the jobs processed by the job processing unit according to each job processing requester. The job processing unit can perform a print function by the engine 204, a copy function by the scanner 217 and the engine 204, a scanner function by the scanner 217, and a device sending/receiving function by the network interface card 211, and performs one of the functions by selecting it by using the panel 206. The job display control method includes: a setting step (for example, step S401 shown in FIG. 4) of setting rules for displaying job processing record items to be displayed on an operation display unit by each job processing requester; an authentication step (for example, step S803 shown in FIG. 8) of conducting authentication for each job processing requester when the job processing requester requests the job processing unit to process a job; a determining step (step S904 shown in FIG. 9) of determining an attribute of the job processing requester authenticated in the authentication step; and a control step (for example, steps S904 through S906 shown in FIG. 9) of displaying the job processing records stored in the record storage unit on the operation display unit by differentiating a display mode based on a result obtained in the determining step and the rules set in the setting step.

According to the above-described job display control method, the user authenticated to use the image forming apparatus can hide job record items that the user does not wish displayed to other users by masking them. Accordingly, the user can customize job record information items to be displayed as desired.

TENTH MODIFIED EXAMPLE

In a tenth modified example, there is provided a job display control method for an image forming apparatus including job processing unit for processing predetermined different jobs, record storage unit for storing job processing records concerning the jobs processed by the job processing unit according to each job processing requester, and a web server for executing a web server function to display a predetermined setting screen by using a browser of an information processing apparatus that can be communicated on a network. The job processing unit can perform a print function by the engine 204, a copy function by the scanner 217 and the engine 204, a scanner function by the scanner 217, and a device sending/receiving function by the network interface card 211, and performs one of the functions by selecting it by using the panel 206. The job display control method includes: a setting step (step S402 shown in FIG. 4) of setting rules for displaying job processing record items set by the predetermined setting screen displayed by using the browser of the information processing apparatus and to be displayed on an operation display unit by each job processing requester; an authentication step (for example, step S803 shown in FIG. 8) of conducting authentication for each job processing requester when the job processing requester requests the job processing unit to process a job; a determining step (for example, step S904 shown in FIG. 9) of determining an attribute of the job processing requester authenticated in the authentication step; and a control step (for example, steps S904 through S906) of displaying the job processing records stored in the record storage unit on the operation display unit by differentiating a display mode based on a result obtained in the determining step and the rules set in the setting step.

According to the above-described job display control method, the user authenticated to use the image forming apparatus from the information processing apparatus, for example, a host computer, via a network can hide job record items that the user does not wish displayed to other users by masking them. Accordingly, the user can customize job record information items to be displayed as desired.

ELEVENTH MODIFIED EXAMPLE

In an eleventh modified example, there is provided a job display control method for an image forming apparatus including job processing unit for processing predetermined different jobs, a web server for executing a web server function to display a predetermined setting screen by using a browser of an information processing apparatus that can be communicated on a network, and record storage unit for storing job processing records concerning the jobs processed by the job processing unit according to each job processing requester. The job processing unit can perform a print function by the engine 204, a copy function by the scanner 217 and the engine 204, a scanner function by the scanner 217, and a device sending/receiving function by the network interface card 211, and performs one of the functions by selecting it by using the panel 206. The job display control method includes: a setting step (for example, step S402 shown in FIG. 4) of setting rules for displaying job processing record items set by the predetermined setting screen displayed by using the browser of the information processing apparatus and to be displayed on an operation display unit by each job processing requester; an authentication step (for example, step S1402 shown in FIG. 14) of conducting authentication for each job processing requester on the predetermined setting screen displayed by using the browser of the information processing apparatus when the job processing requester requests the job processing unit to process a job; and a determining step (for example, step S1705 shown in FIG. 17) of determining an attribute of the job processing requester authenticated in the authentication step. The web server can display the job processing records stored in the record storage unit on the predetermined setting screen displayed by using the browser of the information processing apparatus by differentiating a display mode based on a result obtained in the determining step and the rules set in the setting step (corresponding to steps S1705 through S1708 shown in FIG. 17).

According to the above-described job display control method, the user authenticated to use the image forming apparatus from the information processing apparatus, for example, a host computer, via a network can hide job record items that the user does not wish displayed to other users by masking them on the screen of the information processing apparatus by using the browser. Accordingly, the user can customize job record information items to be displayed as desired.

TWELFTH MODIFIED EXAMPLE

In the job display control method according to any one of the ninth through eleventh modified examples, the attribute determined in the determining step indicates a right given to each job processing requester.

With this arrangement, it can be determined whether a job processing requester to use the image forming apparatus is a general user or the administrator, thereby switching the job record display mode.

THIRTEEN MODIFIED EXAMPLE

In the job display control method according to any one of the ninth through eleventh modified examples, when the determining step determines that the attribute of the job processing requester is exclusive, the control step invalidates the rules set by each job processing requester and displays all the job processing record items on the operation display unit.

With this arrangement, it can be determined whether a job processing requester to use the image forming apparatus is a general user or the administrator. Then, if the job processing requester is the administrator, the job record display mode can be forcefully changed to display record items set by the user that they are displayed by being masked.

FOURTEENTH MODIFIED EXAMPLE

In the job display control method according to any one of the ninth through eleventh modified examples, when the determining step determines that the attribute of the job processing requester is non-exclusive, the control step displays some of the job processing record items by masking them on the operation display unit by reflecting the rules set by each job processing requester.

With this arrangement, if the job processing requester to use the image forming apparatus is a general user, all the job processing record items of the user can be displayed, while the record items of the other users can be displayed according to the rules set by those users.

FIFTEENTH MODIFIED EXAMPLE

In a fifteenth modified example, there is provided a job display control method for an information processing apparatus for obtaining information concerning a predetermined setting screen from a server function provided for an image forming apparatus and for displaying the information concerning the predetermined setting screen on display unit via a browser. The job display control method includes: an input step (for example, step S1401 shown in FIG. 14) of inputting authentication information for specifying a job processing requester by using the predetermined setting screen when the job processing requester makes a job processing request; and a setting step (for example, step S1404 shown in FIG. 4) of setting, after conducting authentication based on the input authentication information, rules for displaying job processing record items on an operation display unit of the image forming apparatus by using the predetermined setting screen by the job processing requester. The browser obtains job processing record information determined by the image forming apparatus according to the rules set in the setting step, and displays the job processing records of each job processing requester on the predetermined setting screen by differentiating a display mode.

According to the above-described job display control method, the user authenticated to use the image forming apparatus from the information processing apparatus, such as a host computer, via a network can display some of the job processing record items that the user does not wish displayed to other users by masking them on the screen of the information processing apparatus by using the browser. Accordingly, the user can customize job record information items to be displayed as desired.

SIXTEENTH MODIFIED EXAMPLE

In a sixteenth modified example, a computer-readable storage medium storing a program for executing the job display control method according to any one of the ninth through fifteenth modified examples is provided.

According to the above-described computer-readable storage medium, the user authenticated to use the image forming apparatus from the information processing apparatus, such as a host computer, via a network can display some of the job processing record items that the user does not wish displayed to other users by masking them on the screen of the information processing apparatus by using the browser. Accordingly, the user can customize job record information items to be displayed as desired.

SEVENTEENTH MODIFIED EXAMPLE

In a seventeenth modified example, a program for executing the job display control method according to any one of the ninth through fifteenth modified examples is provided.

According to the above-described program, the user authenticated to use the image forming apparatus from the information processing apparatus, such as a host computer, via a network can display some of the job processing record items that the user does not wish displayed to other users by masking them on the screen of the information processing apparatus by using the browser. Accordingly, the user can customize job record information items to be displayed as desired.

A description is now given of modified examples in which the image forming apparatus is a printer function.

EIGHTEENTH MODIFIED EXAMPLE

A printer having a record display function includes the following elements: authentication unit (step S401 shown in FIG. 4) conducts authentication for an operator of the printer; record storage unit (record table 214 shown in FIG. 2) stores a record of the operator of the printer; record display setting unit (step S402 shown in FIG. 4) sets whether the operator authenticated by the authentication unit discloses the user's record to other operators; record display unit (steps S904 through S906) displays all records of the authenticated operators and displays record items of the other operators according to rules set by the record display setting unit.

NINETEENTH MODIFIED EXAMPLE

In the printer according to the eighteenth modified example, the printer includes a network interface.

TWENTIETH MODIFIED EXAMPLE

In the printer according to the eighteenth modified example, the printer includes an operation panel (panel 206 shown in FIG. 2) for enabling the operator to conduct authentication.

TWENTY-FIRST MODIFIED EXAMPLE

In the printer according to the eighteenth modified example, the printer includes network authentication unit (step S1402 shown in FIG. 14) for enabling the operator to conduct authentication from a remote place via a network.

TWENTY-SECOND MODIFIED EXAMPLE

In the printer according to the twenty-first modified example, the network authentication unit includes a web server operating on the printer.

TWENTY-THIRD MODIFIED EXAMPLE

In the printer according to the twenty-first modified example, the network authentication unit conducts authentication for operator information contained in a print job sent from the printer driver of a print client.

TWENTY-FOURTH MODIFIED EXAMPLE

In the printer according to the twenty-first modified example, the printer includes an operation panel for displaying record information.

TWENTY-FIFTH MODIFIED EXAMPLE

In the printer according to the eighteenth modified example, the printer includes remote record display unit for displaying record information for an authenticated operator in a remote place via a network.

TWENTY-SIXTH MODIFIED EXAMPLE

In the printer according to the twenty-fifth modified example, the remote record display unit includes a web server operating on the printer.

TWENTY-SEVENTH MODIFIED EXAMPLE

In the printer according to the eighteenth modified example, the record display setting unit is operated on the display panel of the printer.

TWENTY-EIGHTH MODIFIED EXAMPLE

In the printer according to the eighteenth modified example, the record display setting unit can be set by an operator in a remote place via a network.

TWENTY-NINTH MODIFIED EXAMPLE

In the printer according to the eighteenth modified example, the record display setting unit is a web server operating on the printer.

THIRTIETH MODIFIED EXAMPLE

In the printer according to the eighteenth modified example, the record display setting unit sets record display setting information contained in a print job sent from the printer driver of a print client.

THIRTY-FIRST MODIFIED EXAMPLE

A printer having a record display function includes the following elements: administrator setting unit sets the administrator of the printer by using, for example, an administrator registration screen in the screen format shown in FIG. 10; authentication unit (step S402 shown in FIG. 4) conducts authentication for an operator of the printer; record storage unit (record table 214 shown in FIG. 2) stores a record of the operator of the printer; record display setting unit (step S402 shown in FIG. 4) sets whether the operator authenticated by the authentication unit discloses the user's record to other operators; and record display unit (steps S904 through S906) displays all records of the operators without any restriction if the operator authenticated by the authentication unit is the administrator.

THIRTY-SECOND MODIFIED EXAMPLE

In the printer according to the thirty-first modified example, the printer includes a network interface.

THIRTY-THREE MODIFIED EXAMPLE

In the printer according to the thirty-first modified example, the printer includes an operation panel for enabling the operator to conduct authentication.

THIRTY-FOURTH MODIFIED EXAMPLE

In the printer according to the thirty-first modified example, the printer includes network authentication unit for enabling the operator to conduct authentication from a remote place via a network.

THIRTY-FIFTH MODIFIED EXAMPLE

In the printer according to the thirty-fourth modified example, the network authentication unit includes a web server operating on the printer.

THIRTY-SIXTH MODIFIED EXAMPLE

In the printer according to the thirty-fourth modified example, the network authentication unit conducts authentication for operator information contained in a print job sent from the printer driver of a print client.

THIRTY-SEVENTH MODIFIED EXAMPLE

In the printer according to the thirty-first modified example, the printer includes an operation panel for displaying record information.

THIRTY-EIGHTH MODIFIED EXAMPLE

In the printer according to the thirty-first modified example, the printer includes remote record display unit for displaying record information for an authenticated operator in a remote place via a network.

THIRTY-NINTH MODIFIED EXAMPLE

In the printer according to the thirty-first modified example, the remote record display unit includes a web server operating on the printer.

FORTIETH MODIFIED EXAMPLE

In the printer according to the thirty-first modified example, the record display setting unit is operated on the display panel of the printer.

FORTY-FIRST MODIFIED EXAMPLE

In the printer according to the thirty-first modified example, the record display setting unit can be set by an operator in a remote place via a network.

FORTY-SECOND MODIFIED EXAMPLE

In the printer according to the thirty-first modified example, the record display setting unit is a web server operating on the printer.

FORTY-THIRD MODIFIED EXAMPLE

In the printer according to the thirty-first modified example, the record display setting unit sets record display setting information contained in a print job sent from the printer driver of a print client.

FORTY-FOURTH MODIFIED EXAMPLE

In the printer according to the thirty-first modified example, the record display unit includes setting information indicating whether each user discloses record items.

FORTY-FIFTH MODIFIED EXAMPLE

An information processing apparatus having a record display function includes the following elements: a printer driver (corresponding to the printer driver 315 shown in FIG. 3) sends a print job to the printer; authentication information sending unit (corresponding to the web browser 315A shown in FIG. 3) sends authentication information of the printer to the printer from the printer driver; record display setting unit (corresponding to the web browser 315A) sets on the printer driver whether various information sent from the printer driver is disclosed to the other operators.

The categories according to the above-described eighteenth through forty-fifth embodiments encompass corresponding printing methods and corresponding information processing methods. A single or a combination of the advantages disclosed in the first through seventeenth modified examples can be achieved.

According to the foregoing embodiments and modified examples, the display state or the non-display state (masking) can be selected for each record item for each user to use the image forming apparatus. Accordingly, the security of sensitive data contained in the record information can be guaranteed, and yet, information required for the user can always be displayed.

The administrator of the printer or the image forming apparatus can view all items of information, and also, the user can check which jobs are to be displayed and which jobs are not to be displayed, thereby improving the efficiency of the job management work by the administrator.

This application claims priority from Japanese Patent Application No. 2004-145033 filed May 14, 2004, which is hereby incorporated by reference herein.

What is claimed is:

1. An image forming apparatus including job processing means for processing predetermined different jobs submitted by a corresponding job requester and a web server for executing a web server function to display a predetermined setting screen by using a browser of an information processing apparatus that can be communicated on a network, the image forming apparatus comprising:

history record storage means for storing job processing history records concerning the jobs processed by the job processing means according to each job processing requester;

authentication means for conducting an authentication for each job processing requester on the predetermined setting screen displayed by using the browser of the information processing apparatus when the job processing requester requests the job processing means to process a job;

setting means for setting rules for displaying job processing history record items by using the predetermined setting screen displayed by using the browser of the information processing apparatus and to be displayed on an operation display unit; the setting of rules for displaying job processing history record items is performed by the job processing requester when the job processing requester is authenticated by the authentication means; and determining means for determining an attribute of the job processing requester authenticated by the authentication means, wherein the web server can display the job processing history records stored in the history record storage means on the predetermined setting screen displayed by using the browser of the information processing apparatus by differentiating a display mode between the job processing requester and another job processing requester, based on a result obtained by the determining means and the rules set by the setting means, and wherein the display mode of displaying the job processing history records is differentiated by changing the records to be masked depending on the job processing requester or another job processing requester.

2. The image forming apparatus according to claim 1, wherein the attribute determined by the determining means indicates a right given to each job processing requester.

3. The image forming apparatus according to claim 1, wherein the job processing record items comprise at least one of a document name, a user name, a time and date, a number of copies, a color, a print result, a protocol, an image format, and a data size.

4. The image forming apparatus according to claim 1, wherein, when the determining means determines that the attribute of the job processing requester is an administrator, the rules set by each job processing requester are invalidated, and all the job processing history record items are displayed on the operation display unit.

5. The image forming apparatus according to claim 1, wherein the predetermined different jobs processed by the job processing means comprise print function processing, a scanner function processing, copy function processing, and data sending function processing.

6. A method for controlling displaying of jobs for an image forming apparatus including job processing means for processing predetermined different jobs, a web server for executing a web server function to display a predetermined setting screen by using a browser of an information processing apparatus that can be communicated on a network, and record storage means for storing job processing records concerning the jobs processed by the job processing means according to each job processing requester, the method comprising:

conducting authentication for each job processing requester on the predetermined setting screen displayed by using the browser of the information processing apparatus when the job processing requester requests the job processing means to process a job;

setting rules for displaying job processing history record items by using the predetermined setting screen displayed by using the browser of the information processing apparatus and to be displayed on an operation display unit the setting of rules for displaying job processing history record items is performed by the job processing requester when the job processing requester is authenticated; and determining an attribute of an authenticated job processing requester, wherein the web server can display the job processing history records stored in the history record storage means on the predetermined setting screen displayed by using the browser of the information processing apparatus by differentiating a display mode between the job processing requester and another job processing requester, based on a determined attribute and set display rules, and wherein the display mode of displaying the job processing history records is differentiated by changing the records to be masked depending on the job processing requester or another job processing requester.

7. The method according to claim 6, wherein the determined attribute indicates a right given to each job processing requester.

8. The method according to claim 6, wherein, when it is determined that the attribute of the job processing requester is an administrator, the rules set by each job processing requester are invalidated, and all the job processing history record items are displayed on the operation display unit.

9. The method according to claim 6, wherein, when it is determined that the attribute of the job processing requester is a non-administrator, some of the job processing record items are displayed by being masked on the operation display unit by reflecting the rules set by each job processing requester.

10. The method according to claim 6, wherein the job processing record items comprise at least one of a document name, a user name, a time and date, a number of copies, a color, a print result, a protocol, an image format, and a data size.

11. A program, stored on a computer-readable storage medium, for controlling displaying of jobs for an image forming apparatus including job processing means for processing predetermined different jobs, a web server for executing a web server function to display a predetermined setting screen by using a browser of an information processing apparatus that can be communicated on a network, and history record storage means for storing job processing records concerning the jobs processed by the job processing means according to each job processing requester, the program comprising:

conducting authentication for each job processing requester on the predetermined setting screen displayed by using the browser of the information processing apparatus when the job processing requester requests the job processing means to process a job;

setting rules for displaying job processing history record items by using the predetermined setting screen displayed by using the browser of the information processing apparatus and to be displayed on an operation display unit; the setting of rules for displaying job processing history record items is performed by the job processing requester when the job processing requester is authenticated;

determining an attribute of an authenticated job processing requester, wherein the web server can display the job processing records stored in the history record storage means on the predetermined setting screen displayed by using the browser of the information processing apparatus by differentiating a display mode between the job processing requester and another job processing requester, based on a determined attribute and set display rules, and wherein the display mode of displaying the job processing history records is differentiated by changing the records to be masked depending on the job processing requester or another job processing requester.

* * * * *